United States Patent [19]
Edem

[11] Patent Number: 5,805,597
[45] Date of Patent: Sep. 8, 1998

[54] METHOD AND APPARATUS FOR PROVIDING LOW POWER BASIC TELEPHONY TYPE SERVICE OVER A TWISTED PAIR ETHERNET PHYSICAL LAYER

[75] Inventor: Brian Edem, San Jose, Calif.

[73] Assignee: National Semiconductor Corporation, Santa Clara, Calif.

[21] Appl. No.: 660,334

[22] Filed: Jun. 4, 1996

[51] Int. Cl.[6] .................................................. H04L 12/413
[52] U.S. Cl. ........................... 370/445; 370/404; 370/524
[58] Field of Search ................................... 370/465, 466, 370/476, 498, 552, 524, 445, 446, 458, 459, 460, 434, 401, 404; 340/825.5, 825.06, 825.05; 455/527, 574

[56] References Cited

U.S. PATENT DOCUMENTS

| | | | |
|---|---|---|---|
| 3,619,505 | 11/1971 | Melle | 178/69.5 R |
| 3,988,716 | 10/1976 | Fletcher et al. | 340/172.5 |
| 4,220,816 | 9/1980 | Howells et al. | 370/24 |
| 4,258,434 | 3/1981 | Glowinski et al. | 370/60 |
| 4,412,324 | 10/1983 | Glowinski et al. | 370/58 |
| 4,419,765 | 12/1983 | Wycoff et al. | 455/36 |
| 4,445,213 | 4/1984 | Baugh et al. | 370/94 |
| 4,449,248 | 5/1984 | Leslie et al. | 455/38 |
| 4,472,802 | 9/1984 | Pin et al. | 370/104 |
| 4,530,088 | 7/1985 | Hamstra et al. | 370/110 |
| 4,549,292 | 10/1985 | Isaman et al. | 370/89 |
| 4,577,312 | 3/1986 | Nash | 370/84 |
| 4,577,315 | 3/1986 | Otsuka | 370/95 |
| 4,587,650 | 5/1986 | Bell | 370/86 |
| 4,637,014 | 1/1987 | Bell et al. | 370/89 |
| 4,646,291 | 2/1987 | Perntz et al. | 370/85 |
| 4,677,611 | 6/1987 | Yanosy, Jr. et al. | 370/85 |
| 4,766,590 | 8/1988 | Hamada et al. | 370/56 |
| 4,766,591 | 8/1988 | Huang | 370/60 |
| 4,771,426 | 9/1988 | Rattlingourd et al. | 370/102 |
| 4,782,485 | 11/1988 | Gollub | 370/118 |
| 4,800,560 | 1/1989 | Aoki et al. | 370/104 |
| 4,811,367 | 3/1989 | Tajika | 375/116 |
| 4,817,088 | 3/1989 | Adams | 370/88 |
| 4,823,365 | 4/1989 | Loginov | 375/118 |
| 4,825,435 | 4/1989 | Amundsen et al. | 370/97 |
| 4,845,609 | 7/1989 | Lighthart et al. | 364/200 |
| 4,858,232 | 8/1989 | Diaz et al. | 370/86 |
| 4,876,683 | 10/1989 | Suzuki | 370/97 |
| 4,922,438 | 5/1990 | Ballweg | 370/85.15 |
| 4,941,141 | 7/1990 | Hayano | 370/58.1 |
| 4,961,188 | 10/1990 | Lau | 370/94.2 |
| 4,964,121 | 10/1990 | Moore | 370/100.1 |
| 4,985,891 | 1/1991 | Fujiwara et al. | 370/110.1 |
| 4,993,026 | 2/1991 | Yamashita | 370/100.1 |
| 5,001,707 | 3/1991 | Kositpaiboon et al. | 370/94.1 |
| 5,007,045 | 4/1991 | Tsuzuki | 370/94.1 |

(List continued on next page.)

FOREIGN PATENT DOCUMENTS

| | | | |
|---|---|---|---|
| A-4221 474 A1 | 10/1992 | Germany. | |
| A-8911183 | 11/1989 | WIPO. | |

OTHER PUBLICATIONS

"Integrated PBX Systems", An NCC State of the Art Report, The National Computing Centre Limited, Manchester, England, 1987.

"ISDN Basic Rate Interface System Design Guide", Telenetworks document, Aug. 1, 1989.

"ISDN Primary Rate Interface System Design Guide", Telenetworks document, Jul. 28, 1989.

(List continued on next page.)

*Primary Examiner*—Chau Nguyen
*Attorney, Agent, or Firm*—Limbach & Limbach L.L.P.

[57] ABSTRACT

A network communication system having at least two communication protocol modes, namely, a full power communication mode and a low power, limited communication mode. In the low power mode, the link is line powered and utilizes link pulses to represent binary 1s and idle line states to represent binary 0s so that low power mode communication is entirely compatible with all 10BASE T equipment on the network.

31 Claims, 15 Drawing Sheets

U.S. PATENT DOCUMENTS

| | | |
|---|---|---|
| 5,058,110 | 10/1991 | Beach et al. .......................... 370/85.6 |
| 5,065,398 | 11/1991 | Takashima ............................. 370/94.1 |
| 5,095,494 | 3/1992 | Takahashi et al. ....................... 375/10 |
| 5,121,392 | 6/1992 | Sakalian .............................. 370/100.1 |
| 5,123,012 | 6/1992 | Suzuki et al. ............................ 370/66 |
| 5,134,611 | 7/1992 | Steinka et al. ........................... 370/79 |
| 5,138,440 | 8/1992 | Radice ................................... 358/13 |
| 5,179,554 | 1/1993 | Lomicka et al. ..................... 370/85.13 |
| 5,202,899 | 4/1993 | Walsh ..................................... 375/8 |
| 5,224,213 | 6/1993 | Dieffenderfer et al. ................ 395/250 |
| 5,229,998 | 7/1993 | Weisser ................................. 370/108 |
| 5,249,183 | 9/1993 | Wong et al. ........................... 370/228 |
| 5,282,196 | 1/1994 | Clebowicz ............................ 370/58.1 |
| 5,311,114 | 5/1994 | Sambamurthy et al. ................. 370/31 |
| 5,361,261 | 11/1994 | Edem et al. .......................... 370/85.3 |
| 5,410,535 | 4/1995 | Yang et al. ............................. 370/13 |
| 5,440,556 | 8/1995 | Edem et al. ............................. 370/79 |
| 5,521,928 | 5/1996 | Worsley et al. .......................... 370/67 |
| 5,553,071 | 9/1996 | Aranguren et al. .................... 370/445 |
| 5,636,213 | 6/1997 | Eastmond et al. ..................... 370/445 |

OTHER PUBLICATIONS

Draft Supplement to IEEE STD 802.3 "CSMA/CD Access Method and Physical Layer Specifications", The Institute of Electrical and Electronic Engineers, Inc., P802.3/D9, Nov. 15, 1989.

Apple Computer Drawings, Mar. 5, 1990.

Irube, et al., "Integrated Information and Communication System for Business Networks", *Hitachi Review*, vol. 40, No. 3, pp. 241–247 (1991).

Humx Erx "FDDI–II Hybrid Multiplexor (HMUX)", Rev. 2.4, pp. 1–80, Mar. 25, 1991.

IBM Corporation "Task Order Number A–MS–994–C", pp. 6–7, Nov. 1, 1991.

DP8390 "Network Interface Controller: An Introductory Guide", National Semiconductor Corporation, LAN Databook, pp. 1–206 through 1–213, 1992.

DP83932B "Systems–Oriented Network Interface Controller", National Semiconductor Corporation, LAN Databook, pp. 1–288 through 1–383, 1992.

DP83950A "Repeater Interface Controller (RIC)", National Semiconductor Corporation, LAN Databook, pp. 3–3 through 3–73, 1992.

DP83950E–AT IEEE 802.3 "Multi–Port Repeater Evaluation Kit", National Semiconductor Corporation, LAN Databook, pp. 3–75 through 3–87, 1992.

IEEE 802.9 "Draft Standard Integrated Services (IS) LAN Interface at the MAC and PHY Layers", Institute of Electrical and Electronics, Nov. 8, 1992.

"National Proposes Isochoronous Ethernet", *Electronic News*, vol. 38, No. 1940, p. 19, Nov. 30, 1992.

"IBM's Multimedia Venture: Opportunity for its Hardware?", *Electronic News* vol. 38, No. 1930, p. 1, Sep. 21, 1992.

C.A. Gallagher, "IEEE 802.9: A Multi–Service LAN Interface", Second IEEE National Conference on Telecommunications, The University of York, UK, pp. 173–178, Apr. 1989.

P. Martini, et al., "Real–Time Traffic in FDDI–II, Packet Switching vs. Circuit Switching," IEEE Infocom 1991, vol. 3, Apr. 1991, Bal Harbour, Florida, pp. 1413–1420.

F.E. Ross, et al., "FDDI–A–LAN Among MANs", Computer Communications Review, vol. 20, No. 3, New York, pp. 16–31, Jul. 1990.

David Wong, "Second Generation 10BASE T Silicon Solutions", IRE Wescon Convention Record, vol. 35, North Hollywood, CA, pp. 238–242, Nov. 1991.

A communication system proposal presented to representatives of Apple Computer by National Semiconductor Corporation on Mar. 5, 1990.

"VersaNet™ an Ethernet Extension for Isochronous Communications", Aug. 14, 1992; paper sent to National Semiconductor Corporation from Condor Systems, Inc. of San Jose, California on Aug. 18, 1992.

"Fiber Distributed Data Interface (FDDI)—Token Ring Media Access Control (MAC)", American National Standards Institute, ANSI X3.139, 1987.

Loring Wirbel, "Scheme for Fast Ethernet Proposed", appears to be a newspaper article. Date of article is uncertain, but is believed to be prior to Mar. 1993.

"Local Area Network Databook", National Semiconductor Corporation, pp. 1–3, 1–9, 1–242–1–248, 5–3 to 5–7, 1992.

"Token–Ring Network Architecture Reference", IBM, pp. 5–1 through 5–28 and pp. 5–10 and 5–17, Third Edition, Sep. 1989.

METHOD AND APPARATUS FOR PROVIDING LOW POWER BASIC TELEPHONY TYPE SERVICE OVER A TWISTED PAIR ETHERNET PHYSICAL LAYER

FIELD OF THE INVENTION

The invention pertains to networks. More particularly, the invention pertains to networks having low power modes which can support basic telephony type service.

BACKGROUND OF THE INVENTION

Local and wide area networks (LANs and WANS, respectively) are in common use for providing communication between a multiplicity of PCs (personal computers), workstations, telephones, etc.

In a network environment, the transmitters and receivers at both ends of the associated network link use a cycle template to enable the exchange of data. The cycle template continues to be exchanged even when the template contains little or no data. This continuous transmittal of the template requires the continual expenditure of network transmitter and receiver power. Power consumption directly influences the cost of operating the device and is of particular importance if the network component is battery driven. For example, if the network device is a lap top computer, the useful operating life of the device is a direct function of battery life.

In designing a network, there are a large number of possible network configurations (such as ring, tree, star, hybrid combinations of these, etc.) and communication protocols (such as analog or digital and isochronous or non-isochronous) from which to choose. Non-isochronous communication is communication in which data is generated in discrete groups of known duration having a beginning and an end. Most digital data communication is performed in non-isochronous protocol. Isochronous data is a stream of data of a continuous nature having no discernible end prior to the receipt of the end itself. Audio information such as a telephone conversation or video data generated by a video camera are examples of isochronous data.

Multi-service networks can support communication of multiple types, such as isochronous and non-isochronous. The IEEE P802.9a standard describes an exemplary multi-service network protocol.

10BASE T is an ethernet protocol for non-isochronous data. Over the years, many networks have been designed to operated in 10BASE T protocol. However, as faster and more sophisticated communication became possible over the years through improvements in equipment and technology, it has become desirable to provide multi-service protocols which can support both older protocols, such as 10BASE T, and additional communication protocols. If it is desired to design a multi-service network which supports both an older protocol such as 10BASE T and a newer protocol, it is desirable to design the newer protocol to be supportable by the standard hardware for the older protocol. This is so that it is not necessary to replace the entire network and related components with new equipment when upgrading to the newer protocol.

One multi-service protocol which is backwards compatible with 10BASE T is the IEEE P802.9a protocol. U.S. Pat. No. 5,440,556, owned by the same assignee as the present application and incorporated herein by reference, discloses one particular network method and apparatus (hereinafter termed iso-ethernet mode) designed in accordance with the IEEE P802.9a protocol which provides for multi-service operation by the multiplexing and transmission of both non-isochronous and isochronous data in a recurring frame template.

The system is implemented as a star-topology network with data sources and sinks coupled to nodes and the nodes coupled to a central hub in a star topology. Each node (which may have one or more data sources and sinks coupled thereto) assembles the data received from the one or more data sources coupled to it into the designated frame template and transmits it to the hub.

Multiplexed data arriving at the hub is de-multiplexed to separate the isochronous-source data, the non-isochronous-source data and maintenance information. Hub circuitry reassembles the data into one or more outgoing frame templates sent to one or more nodes, respectively, in accordance with the destination of the various data and transmits the template(s) to the node or nodes on which the designated destination data sink is supported. The node parcels the data out to the designated data sinks.

Several star-topology systems can be connected by interconnection of the hubs, for example, in a ring topology. Accordingly, some of the data may be assembled and transmitted to a second hub, where it will be further transmitted to a node coupled to the second hub. In either event, each node receives the frames and parcels the data out to the designated destination sinks which are supported on that node.

Each frame is composed of a plurality of time slots. 10BASE T data is transmitted in time slots within the frame which are reserved for non-isochronous data. Other time slots in the frame are reserved for isochronous data. In the particular method and apparatus disclosed in that patent, multiple channels each of isochronous and non-isochronous data can be simultaneously supported on the network.

Providing network support for the entire multi-service template requires significant power. When data transmission on the network is small and does not necessarily require the normal, full power, multi-service protocol, it is desirable to provide for a simpler, lower power, protocol option.

IEEE protocol P802.9a, for example, provides for negotiation between two network endpoints, e.g., a node and a hub, for selecting a link configuration compatible to both endpoints.

It is desirable to provide a network with a low power link interface option which can support limited communication such as, for example, one or more telephonic links. Accordingly, when communication between a node and a hub on the network is limited, such as to a few telephone calls, power can be saved by switching from the normal, full power, multi-service protocol to a low power protocol. Further, it is desirable to provide a mode of operation which can operate on power supplied to the endpoint over the communication link (as in standard telephony) in the event of a power failure at the location of one or more of the network endpoints.

Accordingly, it is an object of the present invention to provide a network having a full power operational mode for supporting full high-bandwidth communication and a low power operational mode for temporary operation when only limited communication is occurring.

It is another object of the present invention to provide a network with communication endpoints having an operational mode operating on power supplied to the endpoint over the communication link in the event of a power failure at the location of one or more of the network endpoints.

It is a further object of the present invention to provide a low power mode of operation for a network capable of supporting ISDN type telephonic communications.

It is yet another object of the present invention to provide a local area network having a low power operational mode capable of supporting ISDN communication, which operational mode is compatible with a 10BASE T physical layer.

SUMMARY OF THE INVENTION

The invention is a method and apparatus for providing a low power operational mode for a network, which mode is capable of supporting limited communication relative to a full power operational mode.

In the low power mode, digital communication is provided by use of 10BASE T type link pulses such that the communication protocol is compatible with any hardware capable of supporting 10BASE T communication. In particular, an example in which the low power mode supports basic rate ISDN (Integrated Services Digital Network) type communication will be described below. ISDN communication, like most telephonic communication, is based on an 8 KHz sample rate. In accordance with ISDN protocol, the invention provides two 8 bit data channels, B0 and B1, and a signalling channel. The invention also provides for transmission of maintenance bits for setting modes such as a testing mode and to denote signal conditions such as the existence of an incoming call or an off-hook condition. A start delimiter is provided to denote the beginning of a frame and an end bit is provided for DC balancing.

The low power protocol includes a frame template of 125 microseconds duration (i.e., 8 KHz) comprising 26 bit slots, 8 slots each for the two data channels (16 total), an additional 8 bit slots for signalling and maintenance bits, 1 bit slot for the start delimiter bit and 1 end bit slot for DC balancing.

The link pulses are standard 10BASE T link pulses and therefore are compatible with all 10BASE T hardware. The 10BASE T link pulses are 100 nanoseconds in duration and are +2 or −2 volts from nominal line voltage. Binary 0s are represented by line voltage in a designated bit slot, while binary 1s are represented by alternately positive and negative link pulses in a bit slot. Pulse spacing is one microsecond. Accordingly, each frame comprises 26 microseconds of data followed by 99 microseconds of idle. The 99 microsecond idle state prior to the start bit provides for easy identification of the start bit of the frame. The alternating polarity of the pulses representing binary ones helps maintain DC line stability. Specifically, the end bit (bit slot number 26) is a negative going pulse if the last data 1 bit was a positive going pulse. Otherwise, the end bit slot is occupied by line voltage. This assures that there always will be an equal number of positive and negative pulses in each frame to help maintain DC line stability.

The invention also provides a negotiation strategy for transferring directly from full power mode to low power mode without the need to go back into a protocol negotiation state.

DETAILED DESCRIPTION OF THE INVENTION

Figure 1A:
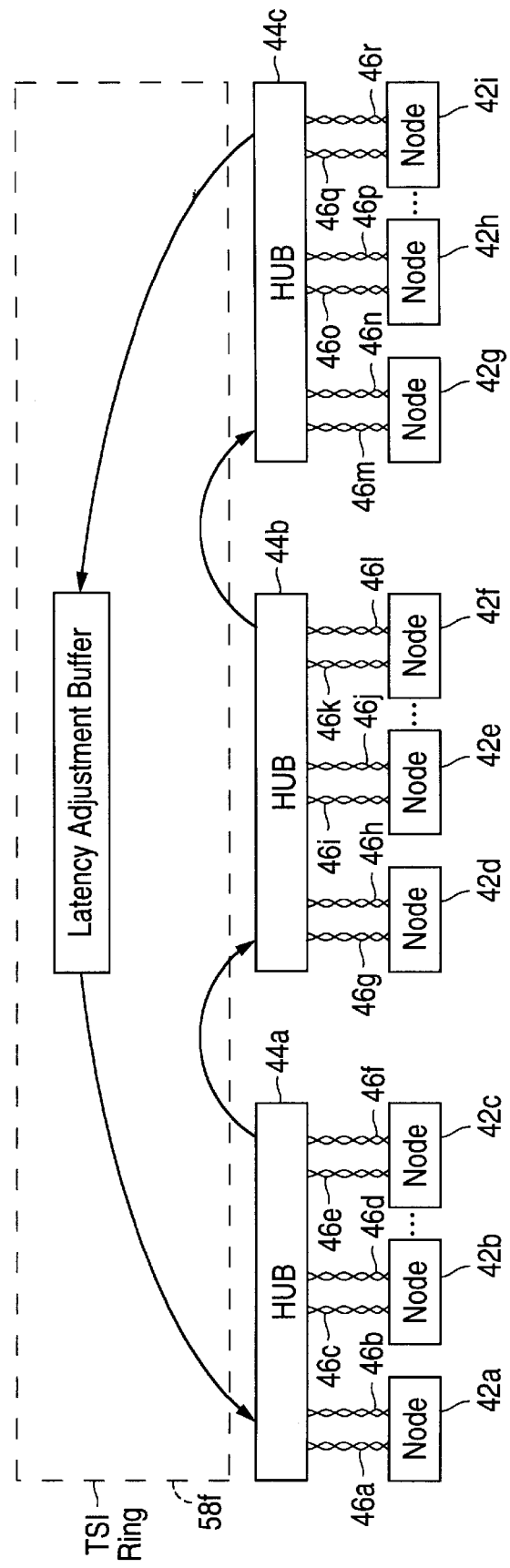
FIG. 1A is a diagram of a star and ring topology communication system according to an embodiment of the present invention.
Figure 1B:
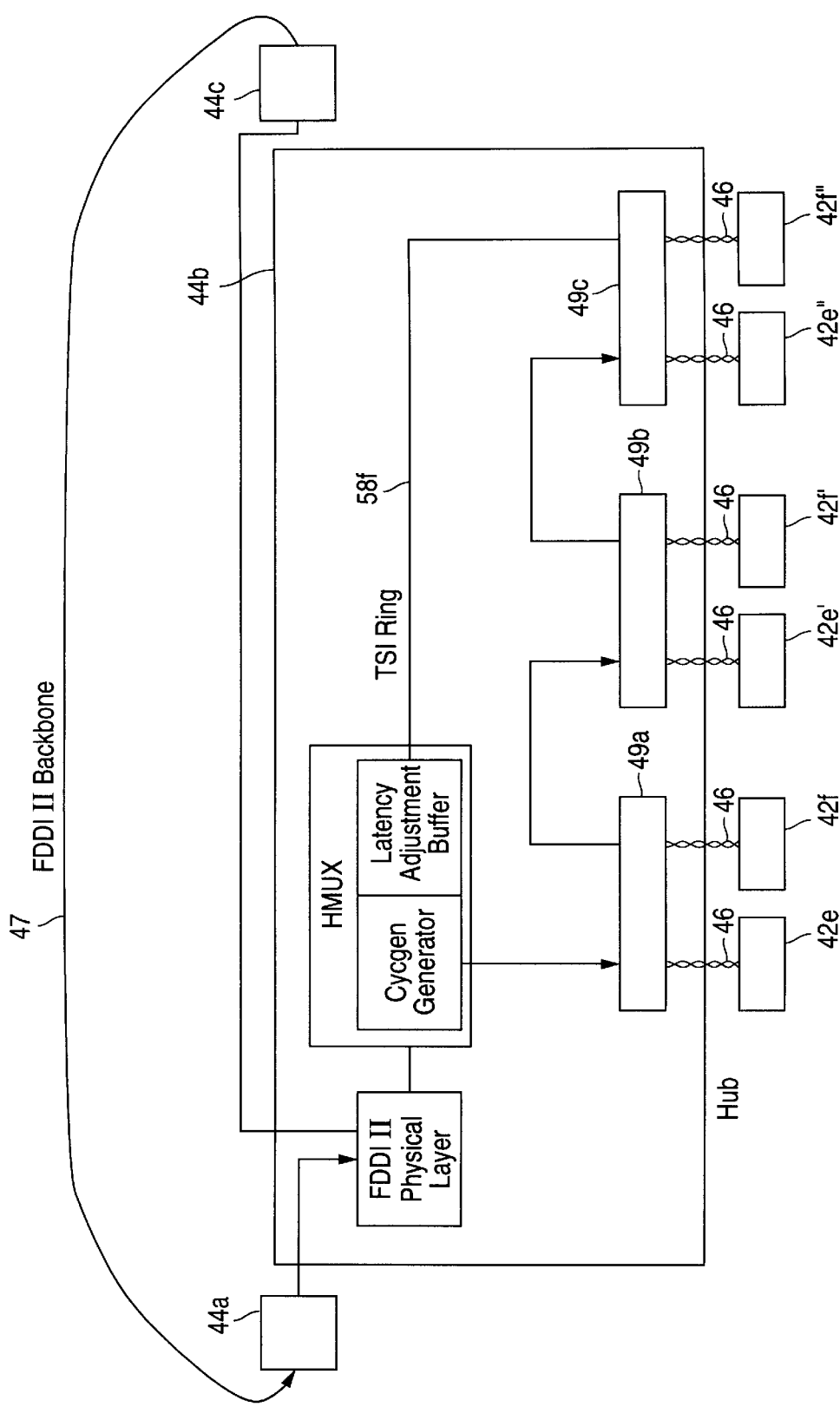
FIG. 1B is a diagram of a star and ring topology communication system having multiple isochronous circuitry within a single hub according to an embodiment of the present invention.
Figure 1C:
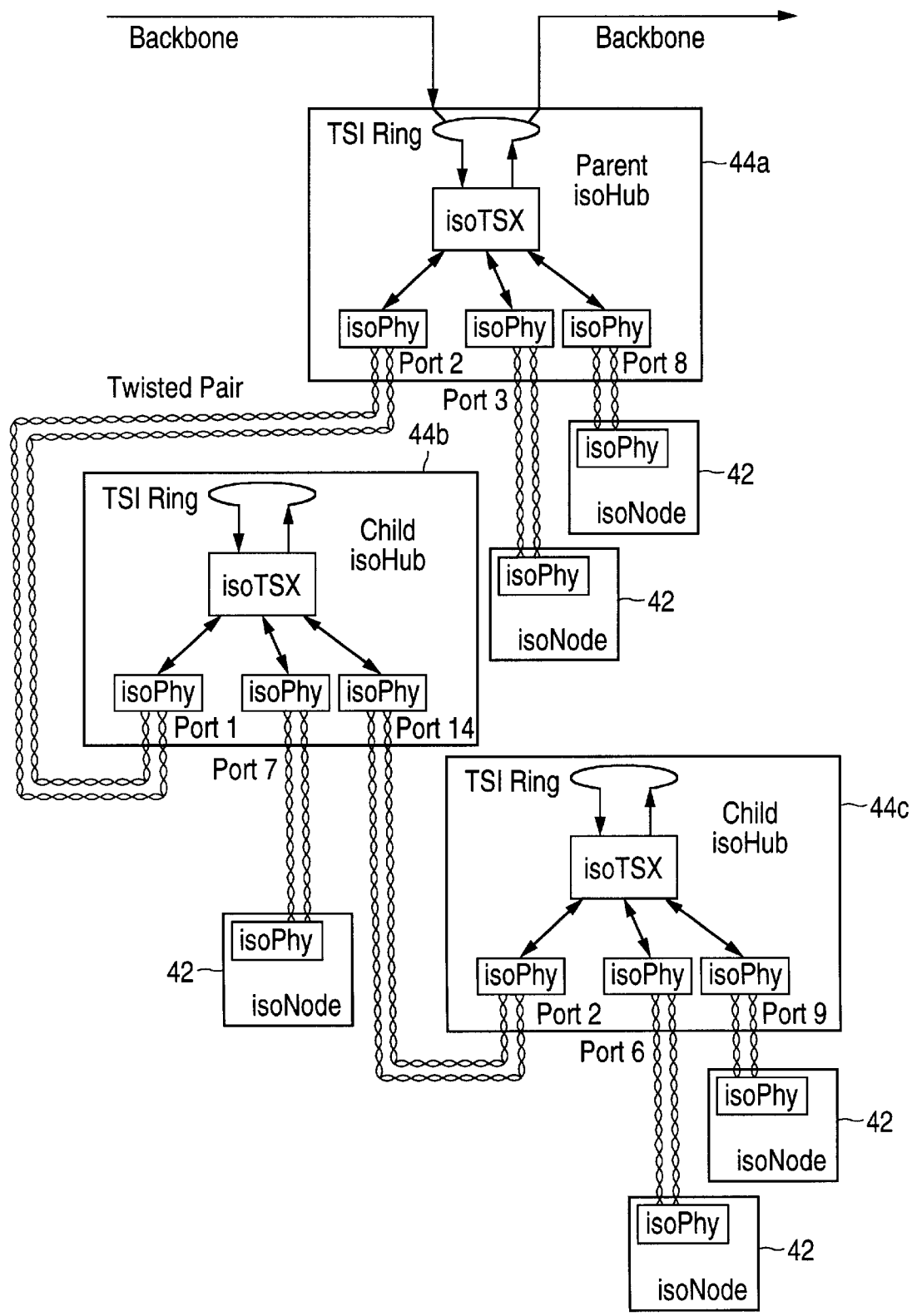
FIG. 1C is a diagram of a tree topology communication system according to an embodiment of the present invention.

U.S. Pat. No. 5,440,556, which is owned by the same assignee as the present application and is incorporated herein by reference, describes a multi-service data communication system for providing combined isochronous and non-isochronous data transmission in a network that can be configured in a star-topology and interconnected in a ring or tree topology. Such a system is shown in FIGS. 1A, 1B or 1C. In the configuration depicted in FIG. 1A, the hubs are connected in a ring-topology with first hub 44a sending data to the second hub 44b, the second hub 44b sending data to the third hub 44c, the third hub sending data back to the first hub 44a via a cycle generator and latency adjustment circuitry. The inter-hub connections are over a Time Slot Interchange (TSI) ring 58f. In one embodiment, an FDDI-II system can be used as the TSI ring 58f. FIG. 1B shows hubs 44a, 44b and 44c arranged in a star and ring topology having multiple isochronous circuitry within a single hub. FIG. 1C shows a tree topology communication system. The parent hub 44a connects to a high bandwidth backbone. Hub 44b operates as a child hub of parent hub 44a and is attached at port 2 of hub 44a. Child hub 44c cascades from child hub 44b.

The star and ring topology includes a plurality of nodes 42a, 42b, 42c attached to a single hub operating on the high bandwidth bus. The exact number of nodes varies depending on the data transmission needs and objectives of the system. Each of the nodes 42a–42c can include various types of sources and sinks such as strictly isochronous sources and sinks, strictly non-isochronous sources and sinks or both isochronous and non-isochronous sources and sinks. Data links comprising physical data transmission media, such as one-way twisted pair wires 46a–46r, couple each node to one of hubs 44a–44c.

Figure 2:
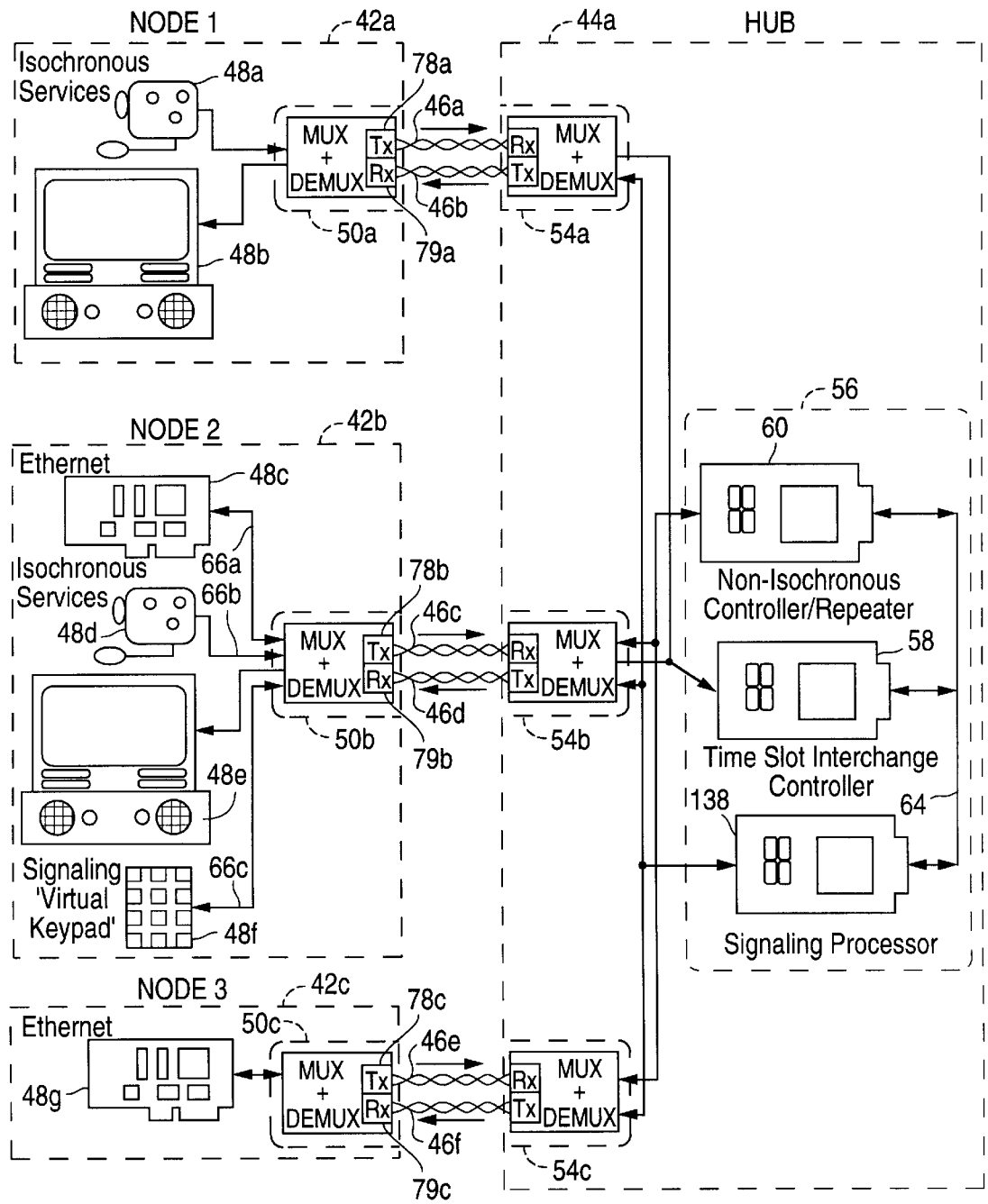
FIG. 2 is a communication system configured according to an embodiment of the present invention.

FIG. 2 shows hub 44a and associated nodes 42a–42c in greater detail. FIG. 2 may, by itself, form a complete star topology system. Each node 42a, 42b, 42c includes circuitry 50a, 50b, 50c. Circuitry 50a–50c transmits data using transmitters 78a, 78b, 78c, for converting data to a form suitable for transmission onto the physical media 46a, 46c, 46e; and receives signals from the physical media 46b, 46d, 46f using receivers 79a, 79b, 79c for conversion to a form suitable for use by the data sinks.

Hub 44a includes circuitry 54a, 54b, 54c for receiving data from the physical media 46a, 46c, 46e; separating the isochronous-sourced data from the non-isochronous-sourced data and the D channel and maintenance channel data; and converting separated data into a form suitable for handling by downstream hub circuitry 56. In the depicted embodiment, the separated isochronous-sourced data is provided to isochronous switching circuitry such as a time slot interchange controller 58 for placing the data on a TSI bus so that it can be transported to and retrieved by other equivalent circuitry 54a–54c in the hub for transmission to various destination nodes 42a–42c to other hubs. The separated non-isochronous data is provided to circuitry 60 configured to convey the non-isochronous data for transmission to destination nodes 42a, 42b, 42c. In an embodiment in which non-isochronous-sourced data includes Ethernet data, the hub circuitry 60 can be a standard Ethernet repeater processor. In this way, the system can be at least partially backwards-compatible with previous Ethernet hub systems.

The D channel and maintenance data is provided to a signaling processor 138. Signaling processor 138 performs various maintenance and control functions such as identifying and alerting users of error conditions, and setting up requested connections, i.e. source/destination paths, for example, by communicating with the isochronous and non-isochronous controllers 58, 60 over data path 64. The isochronous controller 58 can be a data exchanger, e.g., an isochronous switching device such as that described in commonly assigned application Ser. No. 08/146,337, abandoned, and incorporated herein by reference. The non-isochronous controller 60 can be, for example, an Ethernet repeater.

The operation of the components described above may be understood by describing the transfer of data from video camera isochronous source 48d to isochronous sink 48b and from Ethernet MAC non-isochronous source 48c to non-isochronous sink 48g. Data sent from isochronous device 48d is a continuous stream of digitized data having, for example, a rate equal to the American "T1" standard of 1.544 Mb/s (megabits per second). Once initiated, transfer of isochronous data, including null data is continuous until termination of the connection. Data output from the Ethernet MAC 48c is provided at the standard 10 Base T Ethernet rate of 10 Mb/sec. D channel information is provided from a D channel data stream source preferably contained in a MAC or other circuitry in the system, or for example, from the virtual key pad 48f at a variable data rate, such as a rate not exceeding about 64 Kb/sec.

Figure 3:
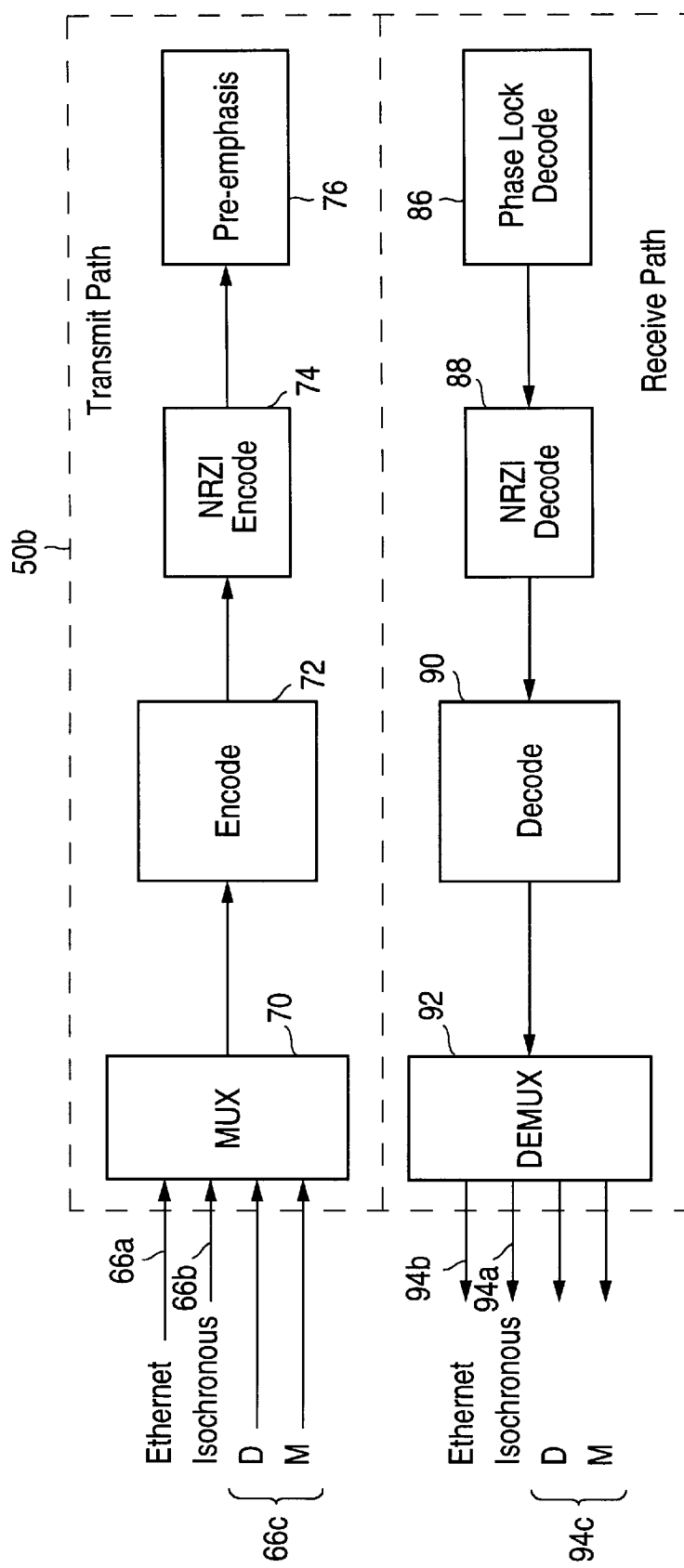
FIG. 3 is a block diagram of circuitry according to an embodiment of the present invention.

Lines 66a, 66b, 66c carry the data streams from sources 48d and 48c to node circuitry 50b. FIG. 3 shows circuitry 50b which is a portion of circuitry 50b shown in FIG. 2. Circuits 50a and 50c of the other nodes contain substantially identical circuitry. In fact, as will be discussed further below, hub circuits 54a, 54b, and 54c also correspond substantially to node circuits 50a, 50b, and 50c and also contain substantially identical circuitry.

Circuitry 50b comprises hardware that operates on the incoming data stream to enable efficient, compatible transmission between the data source and destination. A multiplexer 70 time-division multiplexes the incoming data on a four-bit basis using a repeating series of frames or templates. Preferably, the frames repeat with a period identical to the public telephone network, (i.e., 125 microseconds). A reference clock signal initiated at one physical location in the network and propagated throughout the network, is used for timing the frame transmissions. When the network connects to an external system, such as a public telephone network or other wide area network, the clock signal from the external system can be used to establish the reference clock for the network of the present invention. Thus, in one embodiment, a hub or node connects to a public telephone network and the frame sync from the public telephone network propagates through the network of the present invention.

Table I tabulates a scheme for time division multiplexing the various data streams, additional data and control bytes. Each symbol in Table I represents four bits of data and therefore every group of two symbols represents one 8-bit byte of data. In Table I, E designates four bits of data from the non-isochronous Ethernet stream 66a, B designates four bits of data from the isochronous stream 66b and D represents four bits of data from the D/Maint channel stream 66c. M represents M channel data from the D/Maint channel stream 66c, which preferably is provided by circuitry 50b. In addition, certain byte-length patterns are provided. JK represents a frame synchronization pattern and EM (the first two bytes of block three in Table I) represents an Ethernet "pad" followed by a maintenance byte.

As seen in Table I, each frame contains 256 bytes which can be considered in thirty-two groups of eight bytes each, or four blocks of sixty-four bytes each. The frame structure described provides an isochronous bandwidth capability of 6.144 Mb/sec. Thus, the single isochronous source 48b in the present example can be entirely accommodated using only 48 of the 192 "B" symbols per frame. A basic rate ISDN channel could be supported by using three 64 Kb/s slots within the isochronous channel. Thus, a variety of isochronous sources may be allocated among the available isochronous bandwidth. The frame structure is described more thoroughly in commonly-assigned application Ser. No. 07/969,911, U.S. Pat. No. 5,544,324, entitled "Network for Transmitting Isochronous-Source Data with a Frame Structure", incorporated herein by reference.

As shown in FIG. 3, the time-multiplexed data is then encoded by an encoder 72 to maintain the AC balance of the cable which can be potentially upset by an extended string of binary zeros. An encoding scheme is described in greater detail in commonly-assigned application Ser. No. 07/970,329, U.S. Pat. No. 5,361,261, entitled "Frame-Based Transmission of Data", filed on Nov. 2, 1992, incorporated herein by reference.

The results of the four/five encoding is then further encoded by encoder 74 of FIG. 3 using a non-return to zero, inverted (NRZI) scheme. The four/five-NRZI encoding is particularly useful in networks in which a non-isochronous source is a 10 Base T Ethernet source because the encoding provides for transmission at a signaling rate substantially compatible with the data rates provided and expected by the Ethernet MAC. Other types of encoding or decoding, however, can also be used such as a scheme encoding 8 bits into 10 bits.

After encoding, the data is sent to pre-emphasis circuitry 76 and to a transmitter or driver 78b. Pre-emphasis circuitry 76 compensates the signal transmitted onto the physical medium to reduce jitter. The signal is then transmitted over the physical medium 46c to hub 44a which can include twisted pair, coaxial or fiber optic cable.

Figure 4:
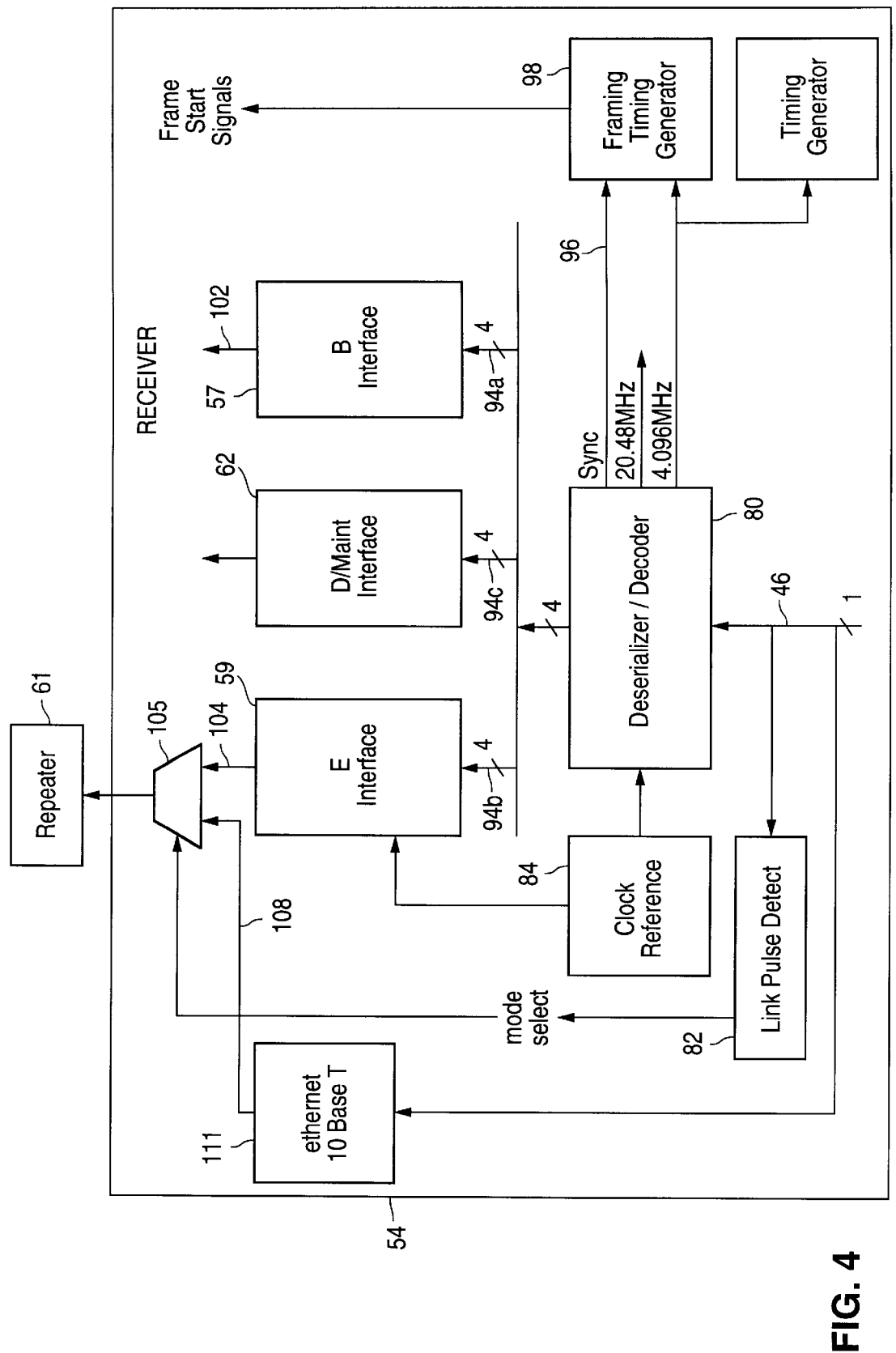
FIG. 4 is a block diagram of hub receiver circuitry according to an embodiment of the present invention.

Hub 44a as seen in FIG. 2 comprises a plurality of circuit devices 54a, 54b, 54c, each one coupled to one of nodes 42a, 42b, 42c by physical layer portion interfaces 46a–46f. Circuit devices 54a, 54b and 54c are substantially identical to each other as well as to node circuit devices 50a, 50b, and 50c. FIG. 4 shows the devices 54 in greater detail. FIG. 4 shows a particular embodiment in which the hub can optionally operate in iso-ethernet mode or ethernet 10BASE T mode. With respect to iso-ethernet mode operation, the data transmitted over the physical layer from the node arrives serially at a de-serializer/decoder 80. Hub de-serializer/decoder 80 includes circuitry which is functionally an inverse of the node receive path circuitry described above with respect to FIG. 3 and is substantially similar to the transmit portion of FIG. 3. It operates to decode the four/five NRZI encoding (phase lock decode circuit 86, NRZI decode circuit 88 and decode circuit 90 in FIG. 3) and to separate the isochronous and non-isochronous sourced data (demultiplexer 92 in FIG. 3). Returning to FIG. 4, de-serializer/decoder 80 also outputs a synchronization signal 96, derived from the JK frame synchronization symbols for use by a framing timing generator 98.

Link pulse detect circuitry 82 also receives the data from the physical layer portion interface for detection of the mode in which the node is operating (e.g. 10 Base T or iso-ethernet) and outputting a mode select signal to multiplexer 105, as described more fully in commonly-assigned application Ser. No. 07/971,018, abandoned, entitled "Network Link Endpoint Capability Detection"and incorporated herein by reference.

Both the non-isochronous-sourced data 104 and the isochronous-sourced data 102 are made available to the various hub circuitry components as needed for transmission to the destination nodes. In one embodiment, the separated isochronous data 102 and non-isochronous data 104 are reconfigured by the respective interfaces 57, 59 to provide isochronous output 102 and non-isochronous output 104, respectively, in a form suitable for transmission to the destination nodes via the physical layer. In one embodiment, the non-isochronous data 94b is configured by the physical layer E interface 59 (FIG. 4) so that the output data 104 can be processed by a repeater device 61 for eventual transmission to destination nodes. As an alternative to using a repeater for the non-isochronous data, packet connections may be linked through media access control layer bridges.

Had the hub been operating in 10BASE T mode instead, then all of the incoming non-isochronous ethernet data would be processed by ethernet 10BASE T circuitry 111 and transmitted to repeater 61 via multiplexer 105. E interface 59 would be blocked by multiplexer 105 from sending data to repeater 61. There would be no isochronous data in the incoming data stream and therefore no data sent to the B interface 57.

In either mode, the D channel and Maintenance data would be processed by the D/Maint interface 62 and forwarded to appropriate control circuitry in signalling controller 138.

The operation and components of the receive interface 54 are described more thoroughly in application Ser. No. 07/970,329, U.S. Pat. No. 5,361,261 entitled "Frame-Based Transmission of Data", incorporated herein by reference. Operation of E interface 59 is described in detail in aforementioned U.S. Pat. No. 5,440,556.

Figure 5:
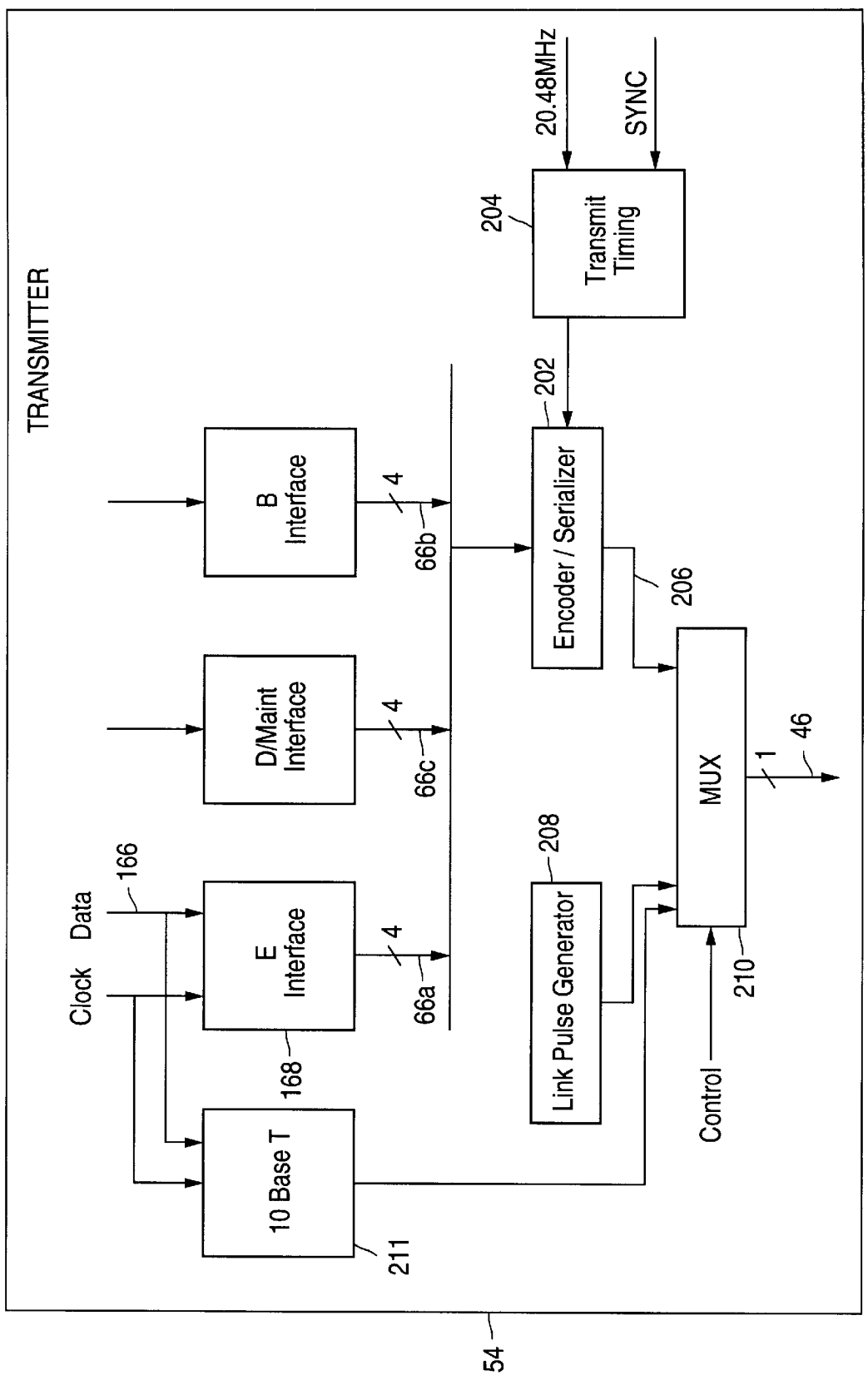
FIG. 5 is a block diagram of a hub transmitter according to an embodiment of the present invention.

FIG. 5 shows a hub transmitter in accordance with the present invention. In iso-ethernet mode, the non-isochronous data 66a output from E transmit interface 168 is provided along with isochronous data output 66b and M channel and D channel data 66c to encoder serializer circuitry 202. The structure and operation of the E transmit interface 168 is described in detail in aforementioned U.S. Pat. No. 5,440,556. Encoder/serializer 202 is configured substantially like the node encoding circuitry depicted in the transmit path FIG. 3. Specifically, encoder/serializer 202 provides a multiplexer for combining the three streams of data 66a, 66b, 66c, a four/five encoder, an NRZI encoder, and pre-emphasis circuitry. The timing of transmission is controlled by transmit timing circuitry 204. Output 206 from the encoder/serializer is selectively combined with link beats from a link pulse generator 208 by multiplexer 210 for purposes of link endpoint detection, as described more thoroughly in application Ser. No. 07/971,018, abandoned, incorporated herein by reference.

Both isochronous and non-isochronous data sent from hub 44a to the nodes 42 is sent in a frame format which is preferably substantially the same as the frame format used for the data sent from the nodes 48 to the hub 44a as described above with respect to Table I.

At the nodes 42, the circuitry 50 includes devices for decoding and de-multiplexing data, similar to that described for performing these functions in the hub and shown in the receive path in FIG. 3, mainly a phase lock decode 86, and NRZI decode 88, a four/five decode 90, and a de-multiplexer 92. Decoded and de-multiplexed data is then delivered to the various data sinks in the nodes 42.

In 10BASE T mode, multiplexer 210 is controlled to select the output signals of 10BASE T circuit 211 rather than E transmit interface 168. The D/Maint data is processed in the same manner as in iso-ethernet mode. In 10BASE T mode, there is no isochronous data and therefore the B transmit interface is idle.

Low Power Mode

The above-described full power multi-service operational mode requires considerable power consumption at the hubs and nodes. The 10BASE T mode also is a full power mode requiring considerable power. In many network applications, however, during a significant portion of the operating time of the network, a node and a hub (or more broadly, any two endpoints) may be exchanging no data or, at least, a very limited amount of data. For instance, in an office environment, network nodes may comprise the communication equipment in a single office or room, while the hub may comprise a central computer room. Each node, therefore, may include a computer, telephone, facsimile machine, etc. In such an environment, it may often be the case that there is no active communication between the data sources or sinks at a node with other endpoints on the network. It may also frequently be the case that the only communication between two endpoints on the network is a telephone call. Accordingly, in such environments it is desirable to provide a secondary operational mode which supports only limited communication, such as basic rate ISDN type communication, and has much lower power requirements than the normal full operational mode or modes. Two network endpoints would negotiate to communicate using the low power protocol when there was no or little communication traffic between the two endpoints. A method and apparatus for providing low power ISDN type communication would be particularly useful if it were backward compatible with 10BASE T physical layer equipment.

In accordance with the present invention, a low power operational mode for a network is provided that supports limited communication and in which data is represented by the presence or absence of standard 10BASE T link pulses so that the protocol is completely backward compatible with 10BASE T equipment.

The invention will be described with respect to a particular embodiment in which the low power mode supports basic rate ISDN type voice channel service. Accordingly, it supports two 8 bit data channels and a signalling channel having a sample rate of 8 KHz. However, it should be understood that the lower power mode can provide any particularly useful limited communication capabilities. As described more fully below, a negotiation scheme is provided for two connected network endpoints to negotiate and enter the lower power mode when communication between the two network endpoints is no more than two telephone type connections.

In accordance with a particular embodiment of the invention, low power mode provides a repeating frame template of 125 microsecond duration (i.e., 8 KHz) comprising 26 bit slots for transmission of data and maintenance information. In order to be backward compatible with 10BASE T physical layer hardware, the low power operational mode protocol utilizes 10BASE T link pulses to represent binary ones. Binary zeros are represented by the absence of a pulse in a given time slot.

Figure 6:
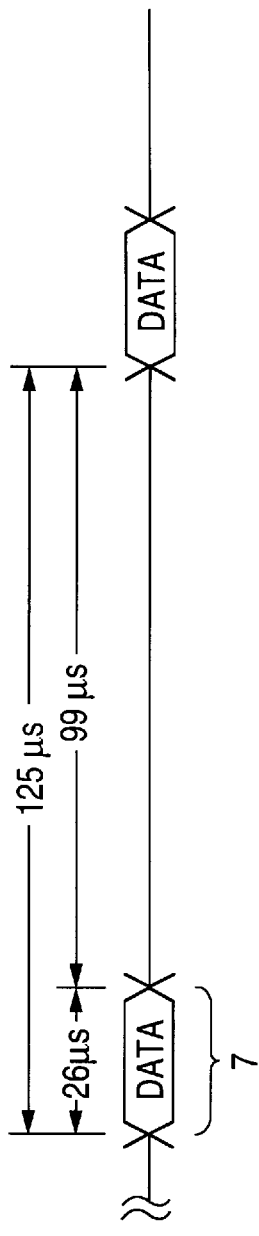
FIGS. 6 and 7 are timing diagrams showing the data structure of the low power operational mode frame template according to an embodiment of the present invention.
Figure 7:
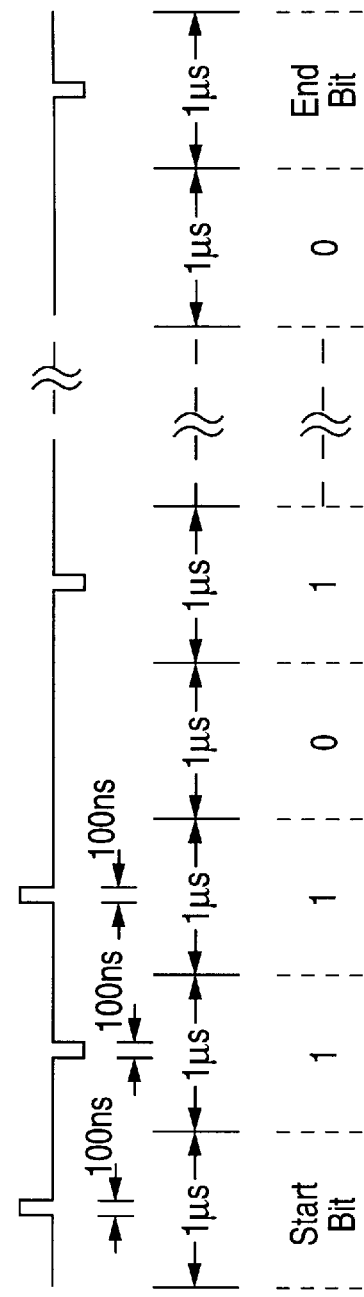

FIGS. 6 and 7 illustrate the frame template. As shown in FIG. 6, each template is 125 microseconds in duration. The 26 bit slots are grouped within the first 26 microseconds of the template. The remaining 99 microseconds of the frame template comprise idle time. This general scheme provides two significant advantages. First, the 99 microsecond idle time between data bursts allows for the line to regain DC balance between data bursts. Second, it allows for easy identification of the first bit slot of a frame.

FIG. 7 illustrates the 26 microsecond data portion of the frame template in greater detail. In particular, the data portion of the frame template comprises 26 contiguous bit slots of one microsecond duration. A 10BASE T link pulse is nominally 100 nanoseconds in duration and has a nominal voltage of plus 2 volts from line voltage. As discussed in more detail below, the present invention utilizes 10BASE T type link pulses of alternating polarity to improve DC line stability. Table II lists the assignments of each bit slot. The first bit slot, slot 0, comprises a start bit which is always a positive going link pulse. The next 8 bit slots (slots 1–8) constitute the 8 bits of the first ISDN data channel, commonly referred to as channel B0. The next 8 bit slots (bit slots 9 through 16), comprise the second 8 bit ISDN data channel, channel B1. Bit slots 17 and 18 are reserved for signalling (D) channel data. Bit slots 19 through 24 comprise the maintenance channel for transmitting maintenance data such as the link synchronization state, a link maintenance request, a link maintenance grant, whether the D channel is enabled, and on hook/off hook condition. Table III shows exemplary assignments for the maintenance bits. Finally, bit slot 25 is reserved for an end pulse as described more fully below.

As shown in FIG. 7, a binary one is represented by a positive or negative going link pulse in a designated bit slot. A binary zero is represented by the absence of any pulse in a slot. In order to maintain DC balance, alternate binary is in the data are represented by alternating positive and negative link pulses. Since the start bit is always a positive going link pulse, the first binary one in the template data will be represented by a negative going link pulse. The next binary one will be represented by a positive going link pulse and so on. If the overall data in bit slots 0 through 24 includes an odd number of binary ones, then a negative going link pulse is placed in the end bit slot, slot 25. If the total number of binary ones in bit slots 0 through 24 is odd, then line voltage is maintained in the end bit slot. In this manner, there will always be an equal number of positive and negative going link pulses per frame, thus helping to maintain DC line stability.

Table IV lists the nominal, minimum and maximum values for the various parameters associated with the frame template.

Figure 8:
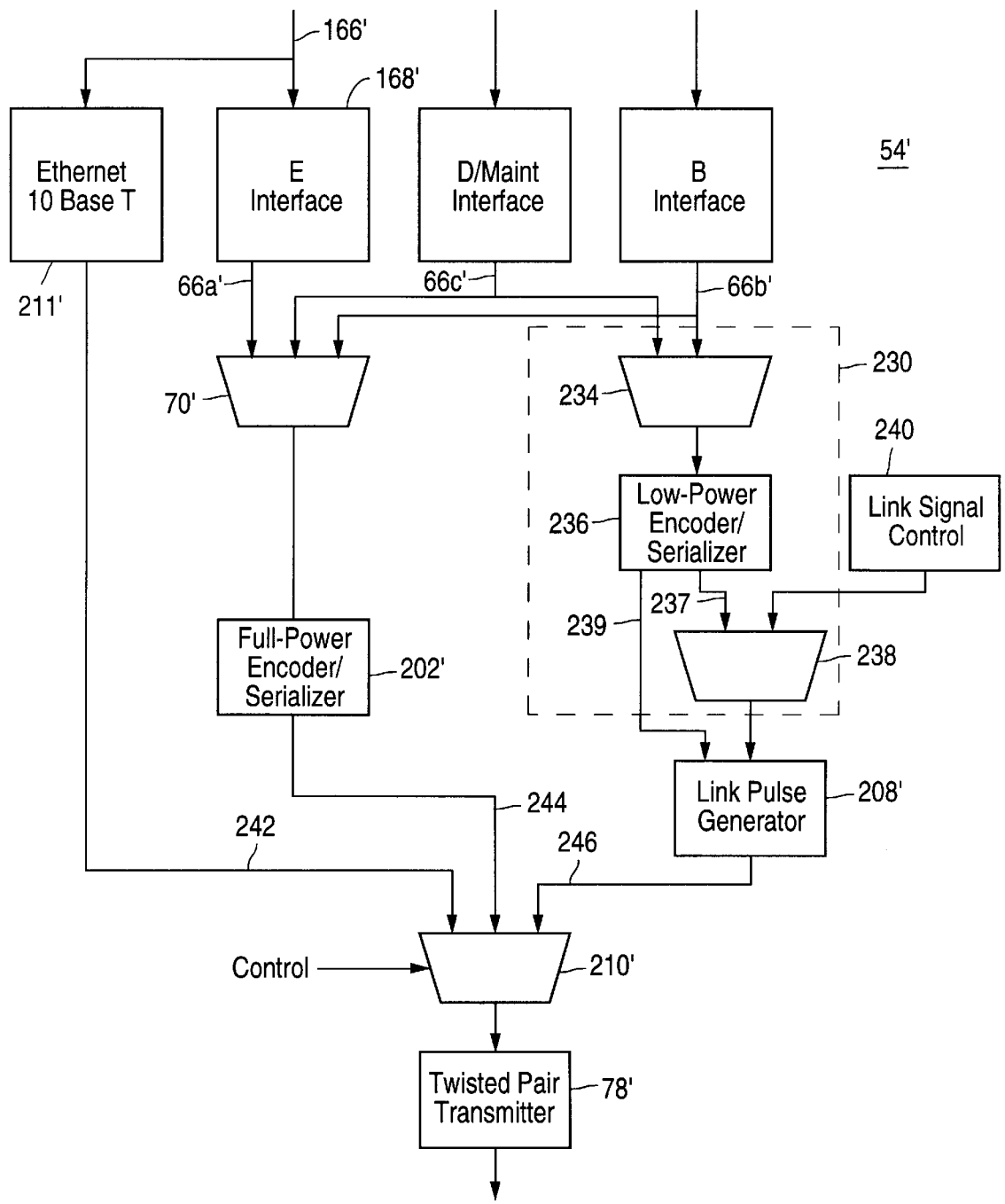
FIG. 8 is a block diagram of a hub transmitter according to a preferred embodiment of the present invention.

FIG. 8 illustrates an exemplary transmitter for a network endpoint (which may be a hub or a node) having low power mode capability in accordance with the present invention as well as two full power modes, namely, a multi-service mode (e.g., the iso-ethernet mode described in detail with respect to FIGS. 1–5) and an ethernet 10BASE T mode (in accordance with the embodiment shown in FIGS. 4 and 5). The transmitter 54' shown in FIG. 8 is substantially similar to the transmitter shown in FIG. 5 except for the addition of the low power mode hardware shown in dashed box 230. When in either of the full power modes, the circuitry operates essentially as described above with respect to FIG. 5. However, when in low power mode, multiplexer 210' is controlled to select the output of link pulse generator circuit 208' rather than the output of full power encoder/serializer 202' or ethernet 10BASE T circuit 211'.

When in low power mode, multiplexer 234 multiplexes the data 66b' and 66c' together and provides it to the low-power encoder/serializer 236. Note that multiplexer 234 receives data only from the D/Maint interface and the B interface since there is no non-isochronous data in low power mode, but only D/Maint data and two B channels of isochronous data. The low power encoder/serializer adds in the start and end bits and formats the data corresponding to the low power frame template.

Since the link pulse generator 208' must alternately generate positive and negative going link pulses in low power mode, low power encoder/serializer 236 has two distinct output terminals coupled to two distinct input terminals of link pulse generator 208' via lines 237 and 239, respectively. One line, line 237, is for standard positive going link pulses and the other line, line 239, is for negative going link pulses, as explained further below. Output line 237 is coupled to a first input terminal of multiplexer 238, the output terminal of which is coupled to a first input terminal of link pulse generator 208', while output line 239 is coupled directly to a second input terminal of link pulse generator 208'. Multiplexer 238 selects the output of the low power encoder/ serializer 236 when the endpoint is in the low power mode.

Since link pulses also are used during protocol negotiation, link pulse generator 208' must serve two functions. Accordingly, the other input of multiplexer 238 is coupled to link signalling control circuit 240. When not in low power mode, multiplexer 238 selects the data from link signalling control circuit 240 rather than the low power encoder/serializer 236 and generates positive going link pulses responsive to appropriate signals from the signalling control circuit 240. Thus, when not in low power mode, link signalling control circuitry 240 uses the link pulse generator 208' for generating standard positive going link pulses for protocol negotiation.

When in low power mode, however, the link pulse generator 208' must generate negative as well as positive going link pulses. Accordingly, link pulse generator 208' has a second input (which is coupled to line 239) and circuitry for inverting the polarity of the link pulse it generates when it receives an appropriate signal on line 239, as opposed to line 237.

Finally, multiplexer 210' selects its first input on line 242 when the endpoint is operating in the ethernet 10BASE T full power mode, selects line 244 when operating in iso-ethernet full power mode and selects the output of link pulse generator 208' on line 246 when the endpoint is in either low power mode or a link protocol negotiation mode (e.g., Auto-Negotiate). The output of multiplexer 210' is provided to the twisted pair transmitter 78' for transmission over the physical layer to the other endpoint.

Figure 9:
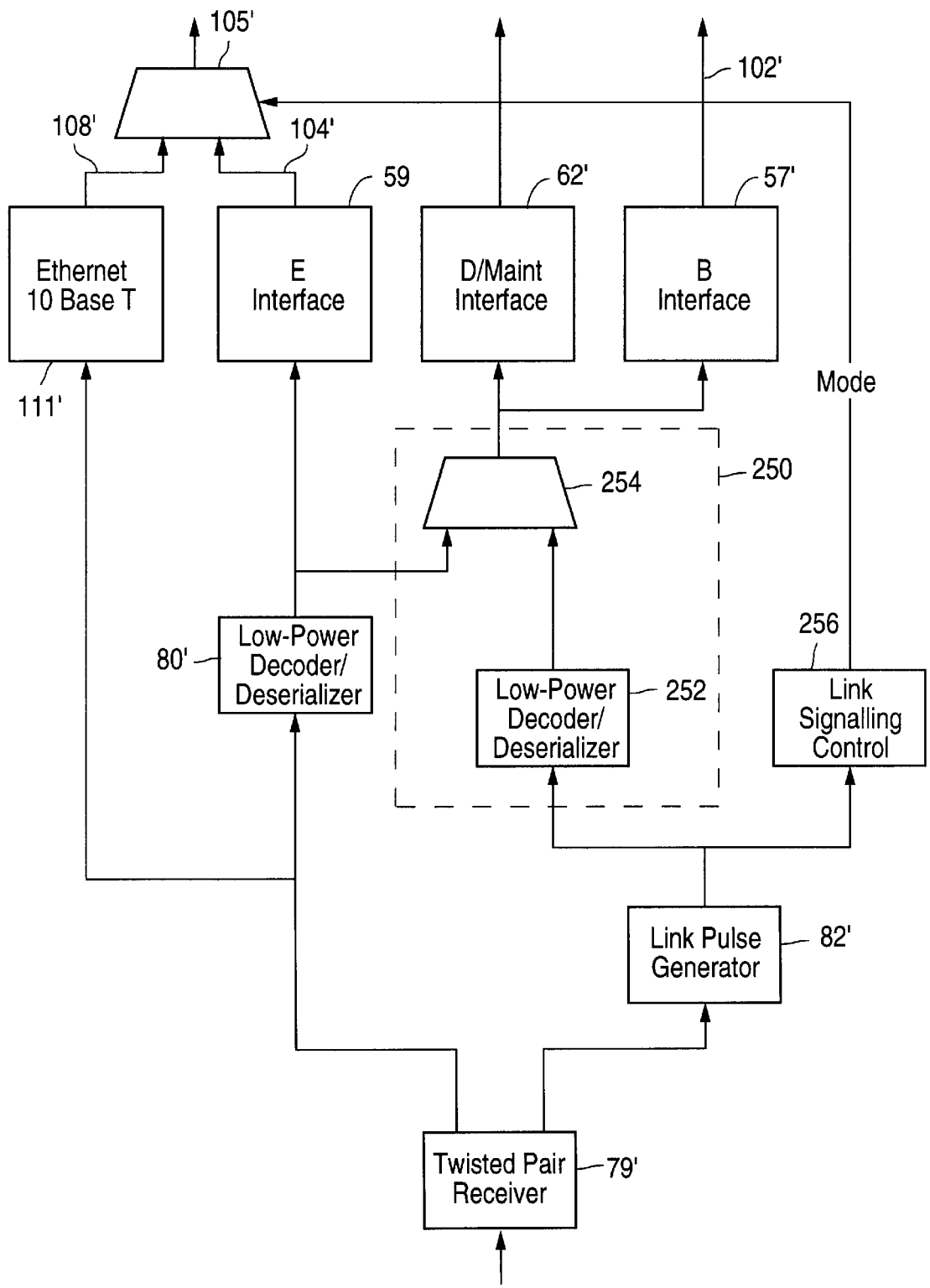
FIG. 9 is a block diagram of hub receiver circuitry according to a preferred embodiment of the present invention.

FIG. 9 shows an exemplary receiver for a network endpoint embodying the low power capability of the present invention. As can be seen, it is essentially an inverse of the transmitter circuitry shown in FIG. 8. As can also be seen, the receiver of FIG. 9 is substantially similar to the receiver shown in FIG. 4 with the addition of circuitry 250 for providing low power mode operation. The circuitry operates as described above with respect to FIG. 4 when in either of the full power modes. In low power mode, data is received from the twisted pair receiver 79' by link pulse detector 82' which converts the received signal into binary data. Link pulse detector 82' recognizes both positive going and negative going link pulses. The binary data output of link pulse detector 82' is processed by low power decoder/deserializer 252 and forwarded to multiplexer 254. When in low power mode, multiplexer 254 selects the input from the low power decoder/deserializer 252 such that it is forwarded to the D/Maint interface 62' and the B interface 57'. When the low power mode is not selected, multiplexer 254 forwards data from full power decoder/deserializer 80' to the D/Maint interface and B interface.

Since, the link pulse detector also is used during negotiation for setting up a link, the output of the link pulse detector also is coupled to link signalling control circuit 256. Link signal control circuit 256, among other things, generates the mode signal that controls multiplexer 105' depending on the full power protocol which is negotiated by the connected endpoints via the transmission and reception of link pulses.

Figure 10:
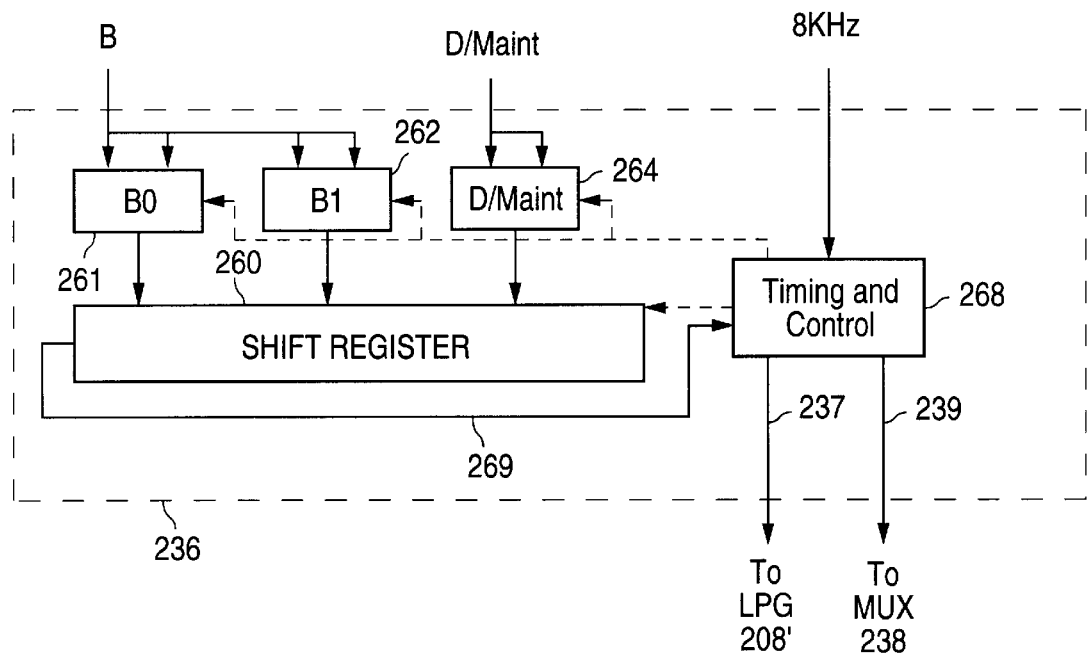
FIG. 10 is a detailed block diagram of the low power encoder/serializer of FIG. 8.

FIG. 10 is a detailed diagram of low power encoder/serializer 236. In FIG. 10, control signals are represented by dashed lines, while data signals are represented by solid lines. The incoming B channel data and D/Maint data are latched in latches 261, 262 and 264 as shown. Each latch is 8 bits wide. Latch 261 corresponds to the B0 channel, latch 262 corresponds to the B1 channel, and latch 264 corresponds to the 8 bits of the D channel and maintenance channel data. The outputs of latches 261, 262 and 264 are coupled into a shift register 260. The output of shift register 260 is forwarded to the link pulse generator via the timing and control circuit 268.

Timing and control circuit 268 controls the timing of the shift register for loading data from the latches and outputting it to the link pulse generator 208'. Timing and control circuitry 268 observes the output 269 of the shift register 260 in order to (1) determine the number of binary ones in the data stream so that it can determine whether it is necessary to insert a one or a zero as the end bit and (2) to instruct link pulse generator 208' via lines 237 and 239 to alternately generate positive and negative going link pulses responsive to the binary ones in the output signal of the shift register 260, as explained above with respect to FIG. 8. The link pulse generator 208' generates a link pulse pattern for the frame responsive to the serial data from the shift register.

Figure 11:
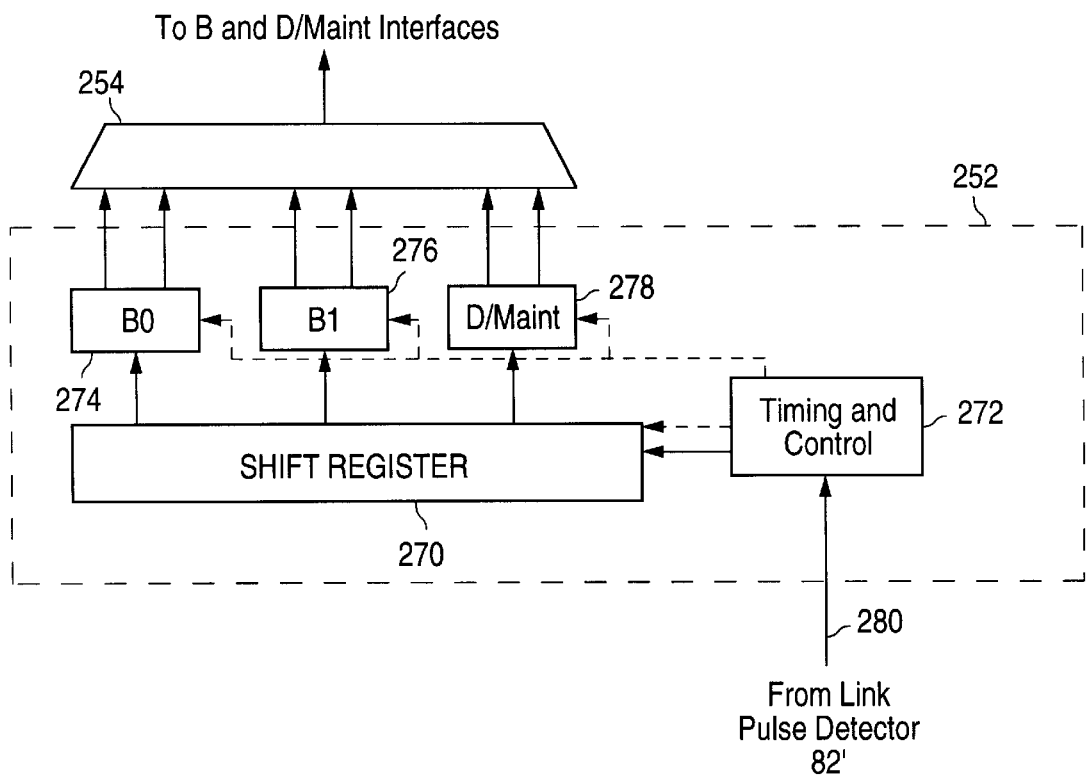
FIG. 11 is a detailed block diagram of the low power decoder/deserializer of FIG. 9.

FIG. 11 illustrates the low power decoder/deserializer 252 of FIG. 9 in detail. In FIG. 11, control signals are represented by dashed lines, while data signals are represented by solid lines. It is essentially the inverse of the encoder 236 shown in FIG. 10. Particularly, the link pulses are received from the link pulse detector 82' and read by timing and control circuit 272. Upon receipt of the start bit, the timing and control circuit 272 controls the shift register 270 to shift in the received data starting with the bit slot following the start bit. Also under the control of timing and control circuit 272, the data is then parallel output from shift register 270 into latches 274, 276 and 278.

The shift register 270 does not accommodate the start bit or the end bit since those bits do not constitute actual data which needs to be processed by the B interface or the D/Maint interface circuitry. As noted above, the start bit is read by timing and control circuit 270 via line 280 in order to begin the proper timing for controlling the shift register. The end bit is simply ignored since its sole purpose is to maintain DC line balance and it contains no information needed by any circuitry in the receiver.

The output of the latches 274, 276 and 278 are output to multiplexer 254 as previously described with respect to FIG. 9.

The IEEE P802.9a specification defines protocols and mechanisms required to implement a remote line powering scheme. The low power operational mode described herein can be maintained by drawing on power supplied by the line. It can be designed to operate on line power normally or, alternately, to operate on local power normally, but transfer to line power in the event of an interruption in local power.

The IEEE P802.9a specification also defines an Auto-Negotiation scheme for configuring an interface between two network endpoints. The scheme uses the First Next Page code word for transmitting the link configuration details for the interface. Table V lists the definitions of the 16 bits within the code word. As shown therein, bit positions D3 and D4 are reserved for indicating all-isochronous mode or multi-service mode, respectively. Thus, when a node endpoint transmits a binary one in bit position D3 of the First Next Page code word, it indicates that the node is capable of all isochronous mode operation. A binary one in bit position D4 would indicate that endpoint also is capable of communicating in a multi-service mode, such as the iso-ethernet mode. As shown, bit positions D5 through D7 are reserved. Any one of them can be used to indicate another operational mode capability, such as the low power mode described herein. In addition, the Priority Resolution table in Annex J.2.1 of IEEE P802.9a should be redefined to incorporate any additional modes.

Figure 12:
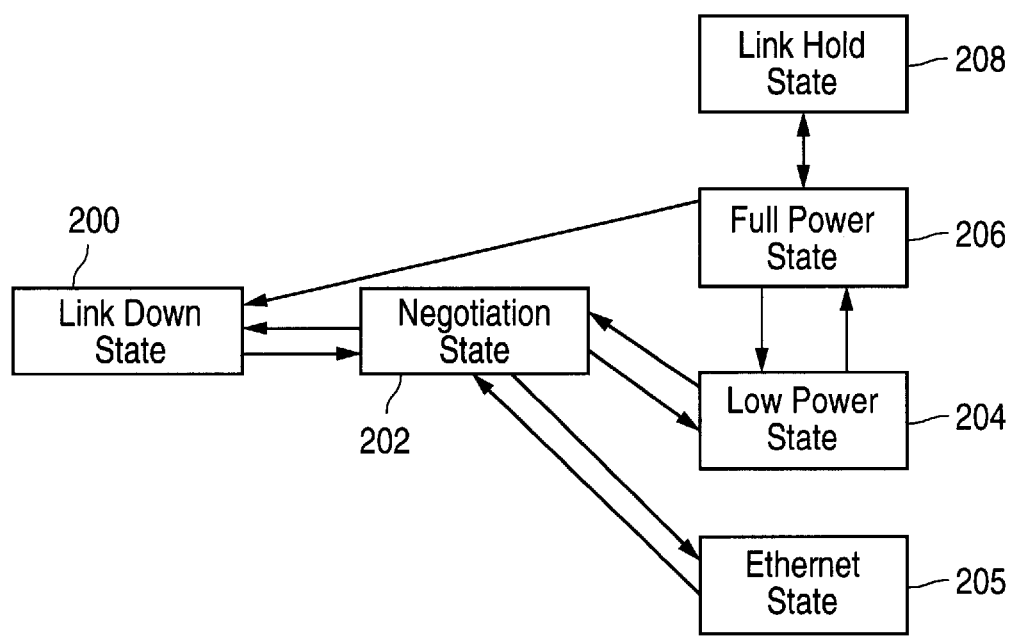
FIG. 12 is a state machine diagram illustrating the various communication states of the network in an embodiment of the invention.

FIG. 12 is a state machine diagram showing the various operational modes of an exemplary endpoint of the present invention. When the interface is down, such that no communication can occur across the physical layer, the endpoint is in the link down state 200. In order to establish an interface, the endpoint must go into the Auto-Negotiation state 202 and negotiate with each remote endpoint to which it is coupled an interface protocol such as all isochronous, multi-service, ethernet 10BASE T, or low power. Finally, there are the actual communication protocol states, such as the low power mode 204 of the present invention, a full-capacity high-speed multi-service mode 206, such as the iso-ethernet mode described above with respect to FIGS. 1 through 5, an ethernet 10BASE T mode 205, and possibly a very low power link hold mode 208 in which periodic pulses are exchanged to indicate that the link is still established, but during which no data is transmitted. In alternate embodiments, the endpoint may be capable of other operational modes such as all isochronous operation.

As shown in FIG. 12, in a preferred embodiment, the Auto-Negotiation can result in entering either the full power iso-ethernet mode 206, the ethernet 10BASE T mode 205, or the low power mode 204.

Auto-Negotiation procedures as defined in IEEE P802.9a should be followed to exchange code words and to configure a link in the Auto-Negotiation mode. For example, if a hub and node on either side of an interface are currently operating in the multi-service mode, the hub or node can use the Auto-Negotiation procedure to reconfigure the link for low power mode operation. Particularly, the initiating endpoint shall disable transmission of the full power frame template and initiate the Auto-Negotiation protocol. By enabling bit D5 within the First Next Page code word, the initiating endpoint can signal to the other endpoint its desire to enter the low power mode. The other endpoint will respond, indicating that it is capable of low power operation (if that is the case). On completion of the Auto-Negotiation procedure, the link shall reconfigure itself for low power mode operation.

In a preferred embodiment, the endpoints also can switch from iso-ethernet mode to low power mode and vice versa without returning to the Auto-Negotiation state.

Figure 13:
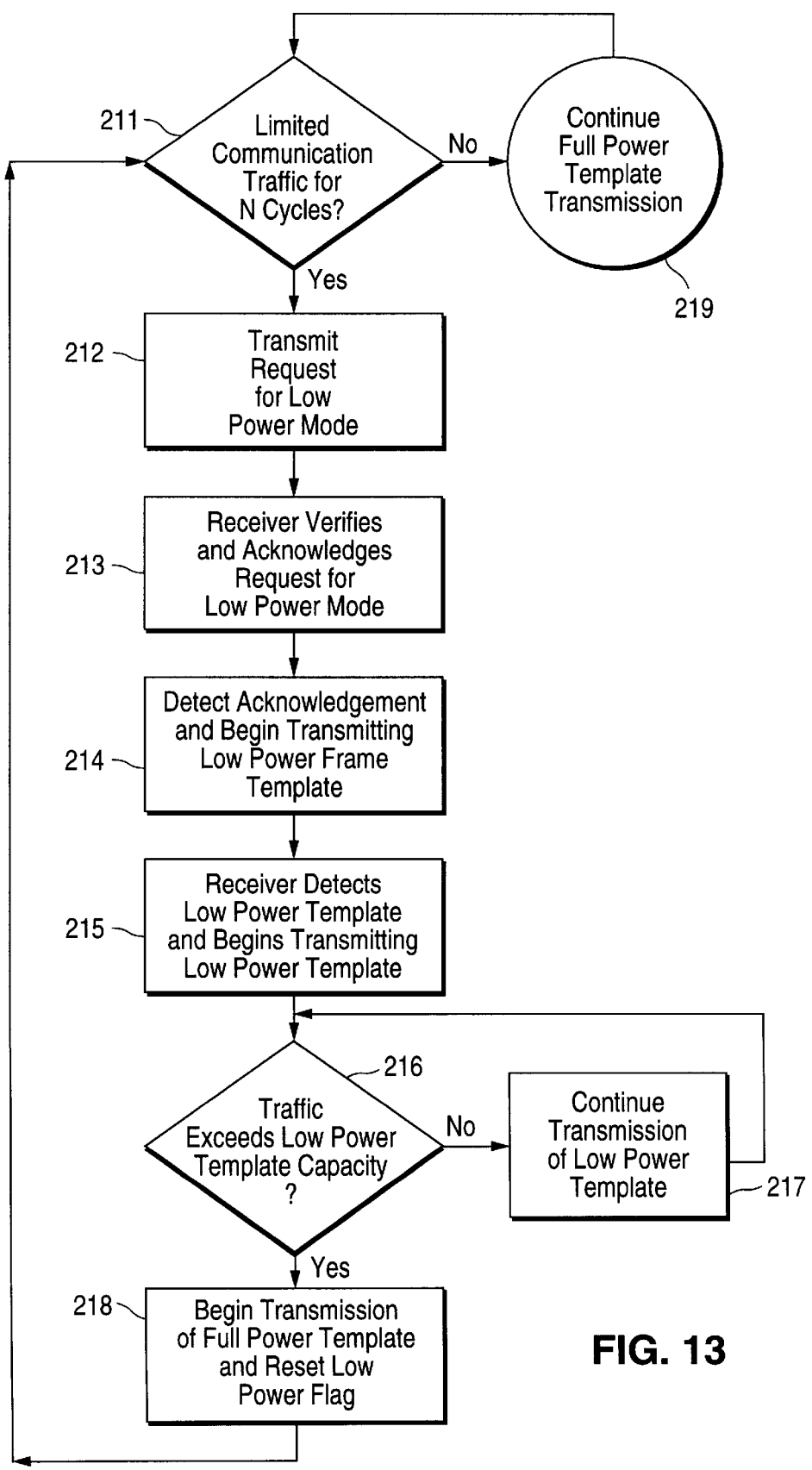
FIG. 13 is a flowchart diagram illustrating negotiation strategy for switching operational modes between the full power and low power modes without re-entering the negotiation mode in accordance with an embodiment of the present invention.

FIG. 13 is a flow chart of an exemplary "quick" negotiation scheme to switch between the iso-ethernet full power mode and the low power mode without returning to the Auto-Negotiation state 202. The chart begins at step 211 with the endpoints in the iso-ethernet full power mode. In step 211, the initiating endpoint determines whether the existing communication traffic between the two endpoints is communication which is supportable in the low power mode, e.g., one or two voice links. This step may be implemented by examining the D channel data in the template to determine what communication is active across the interface. If low power mode operation is not possible, the endpoint simply continues to transmit using the full power frame template, as shown by step 219.

If low power operation is possible, however, in step 212, the initiating endpoint transmits in the M channel stream a bit pattern requesting low power mode. It should be understood that either endpoint can be the initiating endpoint. The remote endpoint which receives the low power request bit pattern in the M channel data stream checks to see if the low power request is received consistently in multiple frames. The number of frames of consistent transmission required to verify the low power request may be any number and may be set by the user.

The remote endpoint then verifies that it has received the low power request bit pattern the designated number of times and transmits an acknowledgement signal back over the link in the M channel data stream, which is received and verified by the initiating endpoint, as illustrated by step 213.

In step 214, the initiating endpoint enters the low power mode by beginning to transmit the low power frame template.

During the low power mode, the initiating endpoint transmits the low power frame template as previously described starting at a point in time where the cycle start indicated would normally be transmitted during transmission of a full power cycle template. The remote endpoint detects the new frame template and also begins transmitting in accordance with the low power frame template, which is detected by the initiating endpoint, as illustrated by step 215. The link is now in the low power mode.

To return to full power mode, in step 216, it is determined if the endpoint must transmit data greater than can be supported by the low power template. If not, transmission of the low power frame template continues, as illustrated by step 217. If so, however, the endpoint simply begins transmitting the full power frame template, as illustrated in step 218. The other endpoint detects the full power frame template and exits low power mode by beginning to transmit its own full power frame template.

Preferably, both when switching from full power mode to low power mode and from low power mode to full power mode, one or more frame template cycles of idle data are exchanged between the two endpoints before data is placed in the template. The number of cycles of idle data also may be user variable.

Figure 14:
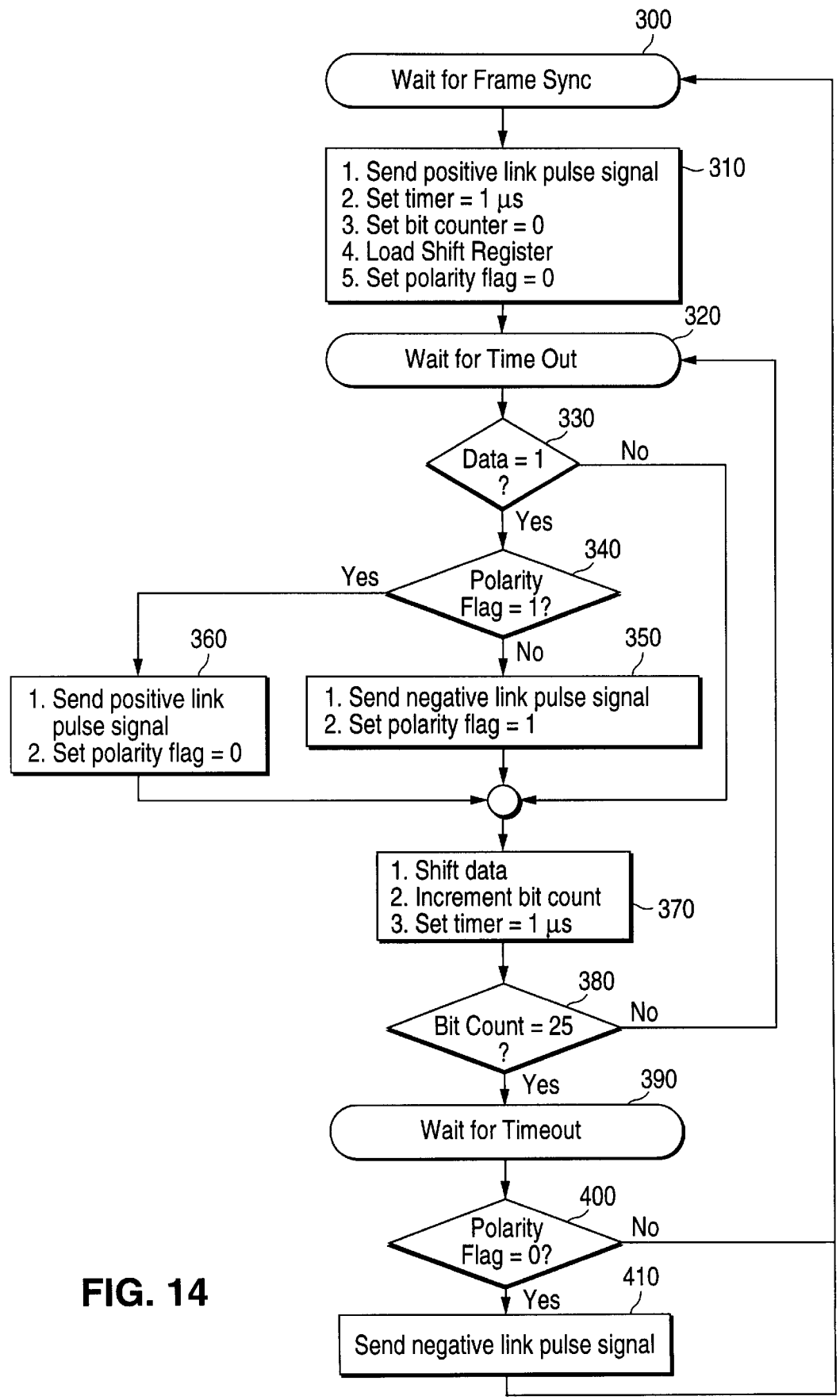
FIG. 14 is a state machine diagram illustrating transmit operation in the low power mode in accordance with an embodiment of the present invention.

FIG. 14 is a state diagram illustrating operation of the timing and control circuit 268 in the transmit path when in low power mode in accordance with the description above. In step 300, the circuit waits to receive indication of frame synchronization before commencing transmission of the frame template of data. When frame synchronization is obtained, in step 310, timing and control circuit 268 sends a signal out on line 239 to cause link pulse generator 208' to generate a positive going link pulse. It also sets a timer to 1 microsecond, sets a bit counter to 0, controls the shift register to parallel load all of the data from the latches 261, 262 and 264, and sets a polarity flag to 0.

Proceeding to step 320, the circuit waits for the timer to reach 0. In step 330, it reads the first bit of data out of the shift register 260 and determines if it is a binary 1 or 0. If it is a zero, then no link pulse need be generated and processing proceeds straight to step 370. However, if it is a 1, processing proceeds to step 340 where it is determined whether the polarity flag is presently set to 1. If not, then processing proceeds to step 350 where timing and control circuit 268 instructs link pulse generator 208', via line 237, to generate a negative going link pulse and then sets the polarity flag to 1.

If the polarity flag had been set to 1, then timing and control circuit 268 instead instructs link pulse generator 208', via line 239 and multiplexer 238, to generate a positive going link pulse and sets the polarity flag to 0 (step 360). Processing will flow from any of (1) step 350, (2) step 360 or (3) a no decision in step 330 to step 370. In step 370; (1) the shift register is instructed to shift the next bit out to the timing and control circuit 268, (2) the bit counter is incremented by one, and (3) the timer is reset to 1 microsecond.

In step 380, it is determined if the bit counter has reached the last data bit, bit number 25. If not, processing returns to step 320 and the operation from step 320 to step 370 is repeated for each of the data bits in the frame template. When the bit counter reaches 25, processing will flow from step 380 to step 390 where timing and control circuit 268 waits for the last 1 microsecond timeout. Then, processing flows to step 400 where it is determined whether it will be necessary to add a negative going link pulse at the end of the frame, bit slot 26. This is accomplished by determining if the polarity flag is set to 0 at the end of the data. If not, then no link pulse need be added and processing flows back to the top step 300, where timing and control circuit 268 waits for the next frame sync. If, however, the polarity flag is set to 0 then a negative link pulse is added at the end of the template in step 410. Processing will then flow back to step 300 to wait for the start of the next frame.

Figure 15:
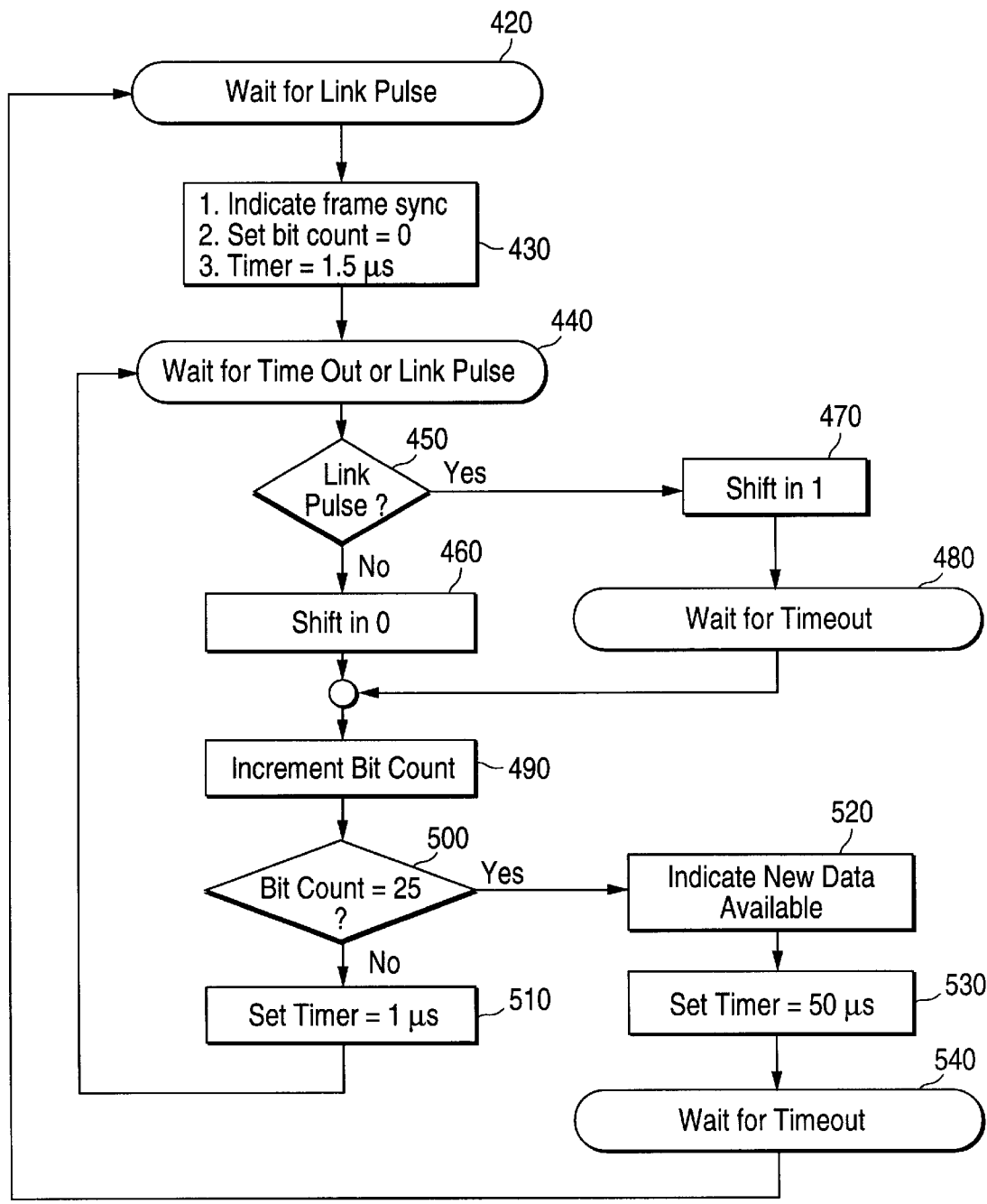
FIG. 15 is a state machine diagram illustrating receive operation in the low power mode in accordance with an embodiment of the present invention.

FIG. 15 is a state diagram illustrating operation of the timing and control circuit 272 in the receive path in low power mode in accordance with the description above. In step 420, timing and control circuit 272 waits to receive a link pulse, which, for reasons which will become clear, will be the start bit of next frame template received from the transmitting endpoint at the other end of the link. In step 430, the circuit 272 issues a frame synchronization signal, sets a bit counter to 0, and sets a timer to 1.5 microseconds in order to center timing on the incoming bit slots. Other than starting the process, the start bit is ignored. In step 440, circuit 272 waits out the timer for a link pulse which may or may not exist in the first data bit slot (the second overall bit slot since the start bit is in the first bit slot). If a link pulse is detected in the bit slot, then timing and control circuit 272 causes a binary 1 to be shifted into shift register 270 (step 470) and waits for the rest of the 1.5 microseconds, if any, to timeout (step 480). If no link pulse is received in the bit slot, then processing proceeds instead to step 460 where circuit 272 causes a binary 0 to be shifted into shift register 270.

From either step 480 or step 460, processing flows to step 490 in which the bit counter is incremented by one. In step 500, circuit 272 determines if all data bit slots in the frame template have been received by checking if the bit counter has reached 25. If not, processing proceeds to step 510, where the timer is reset to 1 microsecond (the duration of the bit slots). Processing then returns to step 440 so that steps 440 through 510 can be repeated for each data bit slot in the frame template.

When the bit counter reaches 25, processing instead flows from step 500 to step 520. In step 520, circuit 272 signals that new data is available, causing the shift register contents to be parallel loaded from the shift register to the latches 274, 276 and 278. Then, in step 530, the timer is set to 50 microseconds. The circuit then waits for the timeout before returning to step 420 to wait for the next link pulse. The 50 microsecond timeout assures that any link pulse which might exist in the end bit slot of the frame template will be ignored since it will be received within 1 microsecond from when the timer was set to 50 microseconds. However, it also assures detection of the start link pulse of the next frame template since it will not be received before approximately 100 microseconds have lapsed since the setting of the timer to 50 microseconds (and thus after the timeout in step 540).

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

TABLE 1

BLOCK 0:

| J | K | E | B | E | B | E | B | E | B | E | B | E | B | E | E | Group0 |
|---|---|---|---|---|---|---|---|---|---|---|---|---|---|---|---|---|
| E | E | E | B | E | B | E | B | E | B | E | B | E | B | E | E | Group1 |
| E | E | E | B | E | B | E | B | E | B | E | B | E | B | E | E | Group2 |
| E | E | E | B | E | B | E | B | E | B | E | B | E | B | E | E | Group3 |
| E | E | E | B | E | B | E | B | E | B | E | B | E | B | E | E | Group4 |
| E | E | E | B | E | B | E | B | E | B | E | B | E | B | E | E | Group5 |
| E | E | E | B | E | B | E | B | E | B | E | B | E | B | E | E | Group6 |
| E | E | E | B | E | B | E | B | E | B | E | B | E | B | E | E | Group7 |

BLOCK 1:

| M | M | E | B | E | B | E | B | E | B | E | B | E | B | E | E | Group8 |
|---|---|---|---|---|---|---|---|---|---|---|---|---|---|---|---|---|
| E | E | E | B | E | B | E | B | E | B | E | B | E | B | E | E | Group9 |
| E | E | E | B | E | B | E | B | E | B | E | B | E | B | E | E | Group10 |
| E | E | E | B | E | B | E | B | E | B | E | B | E | B | E | E | Group11 |
| E | E | E | B | E | B | E | B | E | B | E | B | E | B | E | E | Group12 |
| E | E | E | B | E | B | E | B | E | B | E | B | E | B | E | E | Group13 |
| E | E | E | B | E | B | E | B | E | B | E | B | E | B | E | E | Group14 |
| E | E | E | B | E | B | E | B | E | B | E | B | E | B | E | E | Group15 |

BLOCK 2:

| D | D | E | B | E | B | E | B | E | B | E | B | E | B | E | E | Group16 |
|---|---|---|---|---|---|---|---|---|---|---|---|---|---|---|---|---|
| E | E | E | B | E | B | E | B | E | B | E | B | E | B | E | E | Group17 |
| E | E | E | B | E | B | E | B | E | B | E | B | E | B | E | E | Group18 |
| E | E | E | B | E | B | E | B | E | B | E | B | E | B | E | E | Group19 |
| E | E | E | B | E | B | E | B | E | B | E | B | E | B | E | E | Group20 |
| E | E | E | B | E | B | E | B | E | B | E | B | E | B | E | E | Group21 |
| E | E | E | B | E | B | E | B | E | B | E | B | E | B | E | E | Group22 |
| E | E | E | B | E | B | E | B | E | B | E | B | E | B | E | E | Group23 |

BLOCK 3:

| E | M | E | B | E | B | E | B | E | B | E | B | E | B | E | E | Group24 |
|---|---|---|---|---|---|---|---|---|---|---|---|---|---|---|---|---|
| E | E | E | B | E | B | E | B | E | B | E | B | E | B | E | E | Group25 |
| E | E | E | B | E | B | E | B | E | B | E | B | E | B | E | E | Group26 |
| E | E | E | B | E | B | E | B | E | B | E | B | E | B | E | E | Group27 |
| E | E | E | B | E | B | E | B | E | B | E | B | E | B | E | E | Group28 |
| E | E | E | B | E | B | E | B | E | B | E | B | E | B | E | E | Group29 |
| E | E | E | B | E | B | E | B | E | B | E | B | E | B | E | E | Group30 |
| E | E | E | B | E | B | E | B | E | B | E | B | E | B | E | E | Group31 |

JK = Frame Synchronization Pattern
EM = Ethernet Pad & 4 Maintenance Bits
MM = 8 Maintenance Bits
E = Ethernet Packet Channel
D = D Channel
B = Isochronous Channel

TABLE II

| Bit Slot | Description | kbit/s |
|---|---|---|
| 0 | Start bit (Clock pulse) | 8 |
| 1–8 | B1 channel | 64 |
| 9–16 | B2 channel | 64 |
| 17–18 | D-channel | 16 |
| 19–24 | Maintenance channel (M-channel) | 48 |
| 25 | Extra pulse (if required) to maintain DC balance, that shall be ignored by the receiver. | 8 |

TABLE III

| Bit Slots | M-Channel Description |
|---|---|
| 19 | Link Synchronization state<br>0 - No Lock achieved<br>1 - Frame lock achieved |
| 20 | Link Maintenance request<br>0 - No request<br>1 - Activate remote loopback |
| 21 | Link Maintenance grant<br>0 - No grant<br>1 - Activate grant |

TABLE III-continued

| Bit Slots | M-Channel Description |
|---|---|
| 22 | D-channel status<br>0 - Enabled<br>1 - Disabled |
| 23 | Ring (to TE)/Hook Status (to AU)<br>0 - Disable ringing/On-hook<br>1 - Enable ringing/Off-hook |
| 24 | Reserved |

TABLE IV

| No | Parameter | Min. | Typ. | Max. | units |
|---|---|---|---|---|---|
| T1 | Bit slot Width |  | 100 |  | $\mu s$ |
| T2 | Clock bit slot to Clock bit slot | 95 | 125 | 155 | $\mu s$ |
| T3 | Bit slot to bit slot (Data = 1) | 0.8 | 1 | 1.2 | $\mu s$ |
| T4 | Pulses in a frame | 2 |  | 26 | number |
| T5 | Width of frame |  | 26 |  | $\mu s$ |

TABLE V

| Bit | Symbol | Description |
|---|---|---|
| D0–D2 | PT2, PT1, PT0 | Port type: These bits define the port configuration<br>PT2 PT1 PT0 Description<br>0 0 0 Slave node<br>0 0 1 Master node<br>0 1 0 Normal port on hub<br>0 1 1 Cascaded port on hub<br>1 X X Reserved |
| D3–D7 | IT4, IT3, IT1, IT1, IT0 | Isochronous type: These bits when set (1) define the isochronous capabilities, which are advertised in parallel. J.2.1 describes the Priority resolution table for this field.<br>Bit Symbol Description<br>D3 IT4 All-isochronous mode<br>D4 IT3 Multi-service mode<br>D5 IT2 Reserved (low power mode)<br>D6 IT1 Reserved<br>D7 IT0 Reserved |
| D8 | DCC | D-channel capability<br>0: 4B/5B delimitation (default)<br>1: Clear channel |
| D9 | FD | Full Duplex P-channel in Multi-service mode.<br>0: Half Duplex P-channel<br>1: Full Duplex P-channel |
| D10 | Reserved | Reserved |
| D11 | T | Toggle: This bit shall be toggled every time a new Next page is transmitted. This bit is not used within the base page. |
| D12 | Ack 2 | Acknowledge2: This bit when set (1) signifies that the remote end will comply with the message. This bit shall be set to zero. |
| D13 | MP | Message Page: This bit when set (1) signifies that the Next page received contains a Message page as defined in the IEEE 802.3u specification. This bit shall be set to zero. |
| D14 | Ack | Acknowledge: This bit when set (1) signifies that the local PHY has received three consecutive compatible link patterns from the remote link partner. |
| D15 | NP | Next Page: This bit when set (1) signifies that a Next page follows the current page. This bit shall be set to zero. |

I claim:

1. A method of providing a low power digital communication protocol between first and second communication endpoints over an ethernet physical layer, said method comprising the steps of:

generating digital data at said first endpoint, said digital data comprising a plurality of bit groups representing a communication signal at an instant in time, each of said bit groups comprising a plurality of bits;

periodically organizing each of said bit groups into a serial bit stream;

periodically converting each of said organized bit groups into a repeating frame template, said frame template comprising a bit slot corresponding to each bit of said organized bit group, in which each bit of said organized bit group is represented by the presence or absence of an ethernet link pulse in said corresponding bit slot; and periodically transmitting said frame template from said first endpoint to said second endpoint.

2. The method of claim 1 wherein said digital data comprises multiple channels of data.

3. The method of claim 2 wherein said digital data comprises two voice channels and a signalling channel.

4. The method of claim 1 wherein binary zeroes are represented in said frame template as the absence of a link pulse in the corresponding bit slot and binary ones are represented by link pulses in the corresponding bit slots.

5. The method of claim 4 wherein alternate ones of said binary ones are represented by link pulses of alternate polarity in the corresponding bit slots.

6. The method of claim 5 wherein said frame template further comprises an end bit slot and wherein the step of converting said data into said frame template further comprises the step of placing a link pulse of polarity opposite the polarity of the preceding link pulse in said frame template when said template otherwise comprises an odd number of link pulses.

7. The method of claim 6 wherein said frame template further comprises a start bit slot containing a link pulse positioned at the beginning of said frame template and wherein said frame template comprises all of said bit slots grouped together in close temporal proximity followed by an idle period greater in duration than a duration of all of said bit slots.

8. The method of claim 7 wherein said link pulses are 100 nanoseconds in duration and said bit slots are 1 microsecond in duration.

9. The method of claim 8 wherein said digital data comprises a first data channel comprising 8 bits, a second data channel comprising 8 bits and a signalling channel comprising 8 bits and wherein said frame template is repeated every 125 microseconds.

10. The method of claim 9 wherein said frame template comprises 26 consecutive bit slots followed by 99 microseconds of idle time.

11. The method of claim 1 wherein said first endpoint is capable of communicating in a full power protocol having greater bandwidth than said low power protocol and further comprising the steps of;

generating a low power request signal when said first endpoint is operating in said full power protocol and data traffic at said first endpoint is not greater than that which can be transmitted within said frame template;

transmitting said low power request signal to said second endpoint;

detecting a low power acknowledge signal from said second endpoint indicating that said second endpoint can operate in said low power protocol; and means for switching from said full power protocol to said low power protocol responsive to receipt of said low power acknowledge signal.

12. The method of claim 1 wherein said ethernet physical layer comprises a twisted pair.

13. A network apparatus for providing a low power digital communication protocol between multiple communication endpoints over an ethernet physical layer comprising:

first and second communication endpoints;

an ethernet physical layer interconnecting said first and second communication endpoints;

a data source coupled to said first endpoint for generating digital data, said digital data comprising a plurality of bit groups representing a communication signal at an instant in time, each of said bit groups comprising a plurality of bits;

an encoder/serializer, coupled to receive said data from said data source, for organizing each of said bit groups into a serial bit stream;

a link pulse generator, coupled to receive said bit stream, for converting each of said organized bit groups into a frame template, said frame template comprising a bit slot corresponding to each bit of said organized bit group, in which each bit of said organized bit group is represented by the presence or absence of an ethernet link pulse in said corresponding bit slot; and a transmitter for transmitting said frame template from said first endpoint to said second endpoint.

14. The network apparatus of claim 13 wherein said digital data comprises two voice channels and a signalling channel of data.

15. The network apparatus of claim 14 wherein said digital data comprises an ISDN data stream.

16. The network apparatus of claim 13 wherein said link pulse generator generates a link pulse corresponding to each binary one in said bit stream and maintains line voltage for each binary zero in said bit stream.

17. The network apparatus of claim 16 wherein said link pulse generator generates a link pulse of opposite polarity for alternate binary ones in said data stream.

18. The network apparatus of claim 17 wherein said frame template further comprises a start bit slot and an end bit slot and said encoder/serializer further comprises timing and control circuitry for inserting a binary one bit at the beginning of said bit stream corresponding to said start bit slot and for inserting a binary one at the end of said bit stream when a number of binary ones in said frame template is an odd number.

19. The network apparatus of claim 18 wherein said timing and control circuitry causes said bit stream to be sent to said link pulse generator followed by an idle period greater in duration than a duration of said bit stream before a next bit stream is sent to said link pulse generator.

20. The network apparatus of claim 19 wherein said link pulses are 100 nanoseconds in duration and said bit slots are 1 microsecond in duration.

21. The network apparatus of claim 20 wherein said digital data comprises a first data channel comprising 8 bits per frame template, a second data channel comprising 8 bits per frame template and a maintenance channel comprising 8 bits per frame template and wherein said frame template is repeated every 125 microseconds.

22. The network apparatus of claim 21 wherein said frame template comprises 26 consecutive bit slots followed by 99 microseconds of idle time.

23. The network apparatus of claim 13 wherein said first endpoint further comprises circuitry for providing communication in accordance with a full power protocol providing greater bandwidth than said frame template, said apparatus further comprising;

means for generating a low power request signal when said first endpoint is operating in said full power protocol and data traffic at said first endpoint is not greater than that which can be transmitted within said frame template;

means for transmitting to said second endpoint said low power request signal;

means for detecting a low power acknowledge signal from said second endpoint indicating that said second endpoint can operate in said low power protocol; and means for switching from said full power protocol to said low power protocol responsive to receipt of said low power acknowledge signal.

24. The network apparatus of claim 13 wherein said ethernet physical layer comprises a twisted pair.

25. A network endpoint capable of communicating in a low power digital communication protocol over an ethernet physical layer comprising:

a data source coupled to said endpoint for generating digital data, said digital data comprising a plurality of bit groups representing a communication signal at an instant in time, each of said bit groups comprising a plurality of bits;

an encoder/serializer, coupled to receive said data from said data source, for organizing each of said bit groups into a serial bit stream;

a link pulse generator, coupled to receive said bit stream, for converting each of said organized bit groups into a frame template, said frame template comprising a bit slot corresponding to each bit of said organized bit group, in which each bit of said organized bit group is represented by the presence or absence of an ethernet link pulse in said corresponding bit slot; and a transmitter for transmitting said frame template from said first endpoint to said second endpoint.

26. The network endpoint of claim 25 further comprising;

a data sink coupled to said endpoint for receiving digital data, said digital data comprising a plurality of bit groups representing a communication signal at an instant in time, each of said bit groups comprising a plurality of bits;

a receiver for receiving said frame template from another endpoint over said twisted pair ethernet physical layer;

a link pulse detector, coupled to receive said frame template from said receiver, for detecting link pulses; and a decoder/deserializer, coupled to receive said series of link pulses from said link pulse detector, for converting said series of link pulses into a parallel bit stream.

27. The network endpoint of claim 26 wherein said link pulse generator generates a link pulse corresponding to each binary one in said bit stream and maintains line voltage for each binary zero in said bit stream.

28. The network endpoint of claim 27 wherein said link pulse generator generates a link pulse of opposite polarity for alternate binary ones in said data stream.

29. The network endpoint of claim 28 wherein said frame template further comprises a start bit slot and an end bit slot and said encoder/serializer further comprises timing and control circuitry for inserting a binary one bit at the beginning of said bit stream corresponding to said start bit slot and for inserting a binary one at the end of said bit stream when a number of binary ones in said frame template otherwise is an odd number.

30. The network endpoint of claim 29 wherein said timing and control circuitry causes said bit stream to be sent to said link pulse generator followed by an idle period greater in duration than a duration of said bit stream before a next bit stream is sent to said link pulse generator.

31. The network endpoint of claim 30 wherein said frame template comprises 26 consecutive bit slots followed by 99 microseconds of idle time.

* * * * *